US012644812B2

(12) United States Patent

S. G. Shaqfeh et al.

(10) Patent No.: US 12,644,812 B2

(45) Date of Patent: Jun. 2, 2026

(54) MULTI-MODE MECHANICAL SWIMMER THAT ACTS AS A RHEOMETER

(71) Applicant: The Board of Trustees of the Leland Stanford Junior University, Stanford, CA (US)

(72) Inventors: Eric S. G. Shaqfeh, Oakland, CA (US); Manu Prakash, San Francisco, CA (US); Laurel Kroo, Portola Valley, CA (US); Jeremy Patrick Binagia, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 303 days.

(21) Appl. No.: 18/681,312

(22) PCT Filed: Aug. 8, 2022

(86) PCT No.: PCT/US2022/039724

§ 371 (c)(1),
(2) Date: Feb. 5, 2024

(87) PCT Pub. No.: WO2023/015033

PCT Pub. Date: Feb. 9, 2023

(65) Prior Publication Data

US 2024/0353302 A1 Oct. 24, 2024

Related U.S. Application Data

(60) Provisional application No. 63/230,448, filed on Aug. 6, 2021.

(51) Int. Cl.
*G01N 11/14* (2006.01)

(52) U.S. Cl.
CPC .................................... *G01N 11/14* (2013.01)

(58) Field of Classification Search
CPC ........... G01N 11/14; G01N 2011/0026; G01N 2011/004; G01N 2011/147
See application file for complete search history.

(56) References Cited

FOREIGN PATENT DOCUMENTS

EP 2995928 B1 * 11/2021 ............. G01N 11/14

OTHER PUBLICATIONS

Pak et al., ("Micropropulsion and microrheology in complex fluids via symmetry breaking", 2012, Physics of Fluids 24, 103102). (Year: 2012).*

(Continued)

*Primary Examiner* — Nathaniel J Kolb

(74) *Attorney, Agent, or Firm* — LUMEN PATENT FIRM

(57) ABSTRACT

Improved rheometry is provided using an autonomous swimming robot that can be driven at least in an angular velocity mode and in a torque mode. The resulting improved capability can enable measurement of multiple rheological parameters, such as both normal stress components $\psi_1$ and $\psi_2$, by observing motion of the robot in the fluid. The robot is preferably rotationally symmetric, but with a fore-aft head-tail asymmetry that enables propulsion in complex fluids when the head and tail are driven to rotate opposite each other about the rotational axis of symmetry.

15 Claims, 9 Drawing Sheets

(56) References Cited

OTHER PUBLICATIONS

Puente-Velazquez et al. (Microfluidics and Nanofluidics (2019) 23:108 https://doi.org/10.1007/s10404-019-2275-1).*
Machine translation of EP 2995928 (Year: 2021).*
Binagia et al., "Self-propulsion of a freely suspended swimmer by a swirling tail in a viscoelastic fluid", May 2021, Phys. Rev. Fluids 6, 053301.
Binagia et al., "Swimming with swirl in a viscoelastic fluid", 2020, Journal of Fluid Mechanics v900 A4.
Housiadas et al., "Swimming with Swirl at Low Weissenberg Number", 2021, J. Fluid Mech. (2021), vol. 911, A16.
Murthy et al., "A Lagrangian Model to Predict Microscallop Motion in non Newtonian Fluids", 2019, arXiv:1811.08289v2.
Uchida, "How Do Nanorobots Swim in Slime", 2017, JPSJ News and Comments 14, 05.
Pak et al., "Micropropulsion and microrheology in complex fluids via symmetry breaking", 2012, Physics of Fluids 24, 103102.

* cited by examiner

Swim Direction

MULTI-MODE MECHANICAL SWIMMER THAT ACTS AS A RHEOMETER

CROSS-REFERENCE TO RELATED APPLICATIONS

This application is a 371 of PCT application PCT/US2022/039724 filed Aug. 8, 2022. PCT application PCT/US2022/039724 claims the benefit of U.S. Provisional application 63/230,448 filed Aug. 6, 2021.

STATEMENT OF GOVERNMENT SPONSORED SUPPORT

This invention was made with Government support under contract 1803765 awarded by the National Science Foundation. The Government has certain rights in the invention.

FIELD OF THE INVENTION

This invention relates to use of an autonomous swimming robot as a rheometer.

BACKGROUND

The goal of rheological sensing in fluids is fundamentally about determining bulk statistical averages of intramolecular and intermolecular forces, under a variety of stimuli, to provide a useful/predictive summary of the mechanical properties of the fluid. However, parameters such as the viscosity, primary normal stress coefficient, and relaxation time of a fluid can be significantly affected by the removal of these fluids from their in-situ environment. Benchtop rheometers, for example, must attempt to replicate temperature, pressure and other conditions of the sample for such properties to be representative. Additionally, typical rheometers operate by externally applying a variety of time-varying forces to a sample (e.g. a series of rotations between two plates), and measure the response of the fluid with torque sensors and load cells. The sensitivity of this approach breaks down at strain rates under approximately ~5 hz and under small loads, due to practical limitations of traditional cells.

The combination of these two concerns (namely, the poor sensitivity of measurements at low strain-rates, and concerns over how the sampling process may significantly impact summary statistics in specific environments) has inspired a recent push in the development of micro-rheological sensory devices. Most of these new approaches involve externally pulling or pushing a specifically shaped object through a fluid by some means, and measuring its response (such as a spontaneously induced rotation or a forward speed). Perhaps the most interesting of such examples was by Pak et al. in 2012—who demonstrated that an externally-imposed pure rotation (via a rotating magnetic field) on a rotationally-symmetric object with a fore-aft asymmetry caused the object to propel at low Reynolds number. The object they studied was a pair of rigidly connected spheres of unequal sizes, which propelled in the direction of the smaller sphere. This propulsion speed was shown to be related to the primary normal stress coefficient.

SUMMARY

The approach of Pak et al. has inspired many directions in the past decade, especially related to how microbiological swimming organisms (at low Re) may also take advantage of this fundamental connection between the rotation and translation of objects submerged in viscoelastic fluids. Most recently, our group has studied how two counter-rotating spheres of different sizes may result in propulsion at low Reynolds numbers (Binagia et al. 2021). This opens an exciting possibility of synthetic swimmers as potential rheo-metric devices, even at microscopic scales.

This novel proposed approach of using a true swimmer ("torque-fee" and "force-free" in that no external translational or rotational forces are applied) in the context of rheological sensing has exciting benefits in its portability, autonomy, and ability to physically access more difficult environments. Such examples might include: in-situ fluid sensing within veins or other highly-confined complex fluids, sensing within biological systems that are known to be sensitive to magnetic fields; deployable autonomous rheometers for exploring other planets (payload minimal), or minimal-infrastructure systems for deep ocean surveillance.

In section B below, we experimentally study a true "swimming rheometer" at very low Reynolds number, and consider its use for measuring both the first and second normal stress coefficients of a viscoelastic fluid. We discuss optimization of the head and tail geometries, and discuss the body/fluid interaction that leads to the propulsion. This proof-of-concept device suggests that much smaller devices in less viscous fluids would be capable of a similar dynamic range and sensitivity. This study demonstrates true internally-driven locomotion at low Reynolds number, while simultaneously exhibiting a capacity for passive sensing of multiple rheological parameters.

DETAILED DESCRIPTION

Figure 1A:
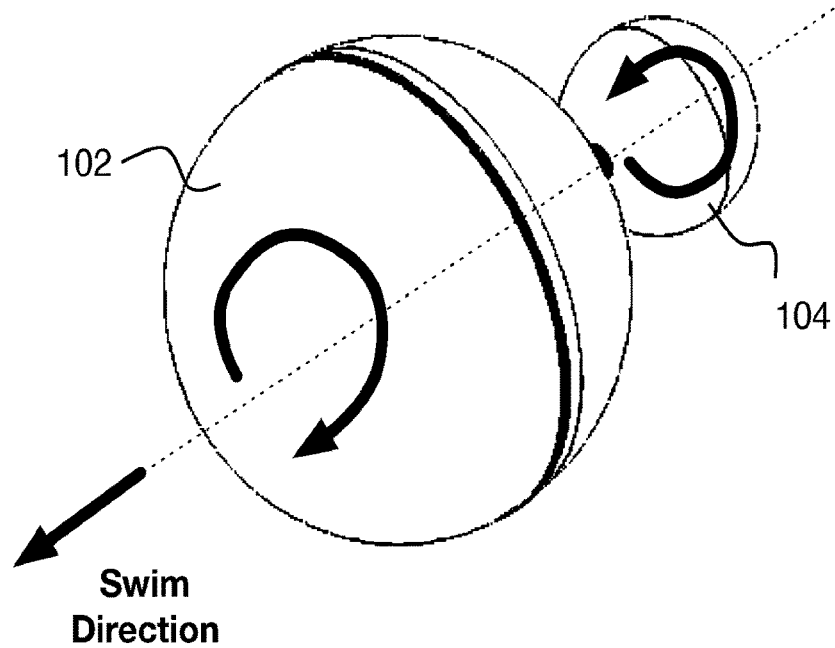
FIGS. 1A-C show several views of an exemplary robot rheometer.

Section A describes general principles relating to the invention, and also includes some exemplary embodiments. Section B is a detailed experimental example. Section C presents further options and variations relating to robot design. Section D presents some further data.

A) General Principles

A1) Capabilities of a Multi-Mode Rheometer

A key aspect of this work is operation in either constant Torque or Constant Rotational velocity mode. The control velocity is $\Omega_S$. Earlier work (e.g., Binagia et al. 2021) refers only to constant rotational velocity mode, which is limited in terms of measurement capabilities as discussed below. The discovery that these two different modes are both important is a significant aspect of this work.

Measurements in velocity in terms of U and $\Omega_R$. In constant velocity mode, applying steady rotation speed, these will give you the ratio of primary normal stress coefficient to viscosity or the relaxation time as a function of Deborah number. In constant torque mode, at a constant torque, these will give you the viscosity and thus the primary normal stress coefficient. (Note: Actually, gives the sum of primary normal stress coefficient and the second normal stress coefficient, but the latter is typically small.)

Time dependent measures can include a) Oscillating tail speed about a fixed rotation rate, b) suddenly stopping rotation of tail after steady state, c) sudden acceleration from a stopped configuration. These again can be operated in time dependent torque applied to tail, or time dependent speed of tail rotation. Measurements include again now the time dependent response U and $\Omega_R$. These responses can be interpreted to give the linear viscoelasticity (moduli and/or complex viscosity) as a function of frequency (of tail rotation speed), or the nonlinear relaxation time spectrum.

Transducer (thrust and/or torque sensor) added in the linkage between head and tail can serve to a) independently check measurement of primary normal stress coefficient and viscosity, b) separate the primary normal stress coefficient from the second normal stress coefficient. Measurements include the thrust force at linkage and torque exerted by fluid in gap.

In one instance; an actuator/motor/transducer exists only in one of the symmetric objects while the other counter rotates via magnetic coupling between the two spheres/bodies of revolution.

This configuration allows for "direct" pressure/force measurement between the two spheres utilizing a load cell. The load cell reports the normal force between the two bodies of revolution (head and tail).

The rheometer described here can perform measurements in-situ without ever taking the sample out of the context. Most biological samples change as they are removed from the context they were created. Our approach opens new avenues for in-situ rheology for non-Newtonian samples in both biological and field sampling.

In-situ rheological measurements allow probing of heterogenous samples where the probe traverses a non-homogenous environment. Since the measurement is based on local fluid; instantaneous measurements can be correlated to systematic changes that might occur over long length scales providing an understanding for heterogeneity in the sample.

Field rheological measurements also need to be made where removing samples is not feasible (high pressure, temperature). Our approach is amenable to remote monitoring and hence makes measurements feasible in unique environments.

By design—the chosen shapes for the rheological probe are axi-symmetric. Symmetry of the shape provides simple manufacturing processes to vary the scale of the device from centimeter scale (current implementation) to micron scales. This opens up new avenues for operating the device in small sample volumes in-situ.

The rheological probe can also contain optical, radio or magnetic pings for remote monitoring of the probe rotation and translation where direct line of site observations might be inhibited. Such an approach allows for deep-tissue measurements or environments that cannot be optically probed.

The measurement range and measurement error in the mechanical swimmer is determined by the precision in velocity control (i.e. rotation of the "tail") and velocity measurement (i.e. center of mass velocity and rotational velocity of the "head") at a given size of the constructed swimmer. Therefore there is the potential to make accurate measurements in ranges that are very difficult to make in commercial, macroscopic rheometers. For example, measurements at very low values of the normal stress coefficient could be envisaged since as long as the elastic stresses produce any measurable propulsion velocity.

A2) Exemplary Embodiments

An exemplary embodiment is a method of performing in-situ measurements of rheological properties of a complex liquid, the method comprising: disposing one or more robots in the complex liquid, wherein each robot has a first part and a second part that can be driven in rotation relative to each other, and determining one or more rheological properties of the complex liquid from observation of motion of the one or more robots in the complex liquid. The one or more robots are each capable of operating in an angular velocity mode and a torque mode, and at least one of the one or more robots is operated in the torque mode. The angular velocity mode entails control of the relative angular velocity of the first part and the second part. The torque mode entails control of an applied torque between the first part and the second part. and The observation of motion can include observation of one or more parameters selected from the group consisting of: angular velocity of the first part, angular velocity of the second part, and center-of-mass motion.

Each of the one or more rheological properties of the complex liquid can be steady-state or time-dependent.

The determining one or more rheological properties of the complex liquid can include determining two or more properties selected from the group consisting of: viscosity, normal stress coefficient $\psi_1$ and normal stress coefficient $\psi_2$.

The one or more rheological properties can include a spectrum of relaxation times of the complex liquid. A spectrum of relaxation times can be measured for both near-equilibrium conditions (small amplitude deformation) or far from equilibrium (large amplitude deformation).

The robot preferably has an axis of rotation and has a shape that is rotationally symmetric about the axis of rotation.

The first part and the second part can be coupled to each other with a coupling selected from the group consisting of: magnetic coupling and mechanical coupling.

The first part can be a spheroidal head, and the second part can be a spheroidal tail, where the spheroidal tail is preferably easier to rotate in the complex liquid than the spheroidal head (i.e., a smaller torque is needed to provide a given angular rotation rate to the tail than to the head). Here a spheroid is the shape generated by rotating an ellipse about its major or minor axis.

On-board closed-loop control can be used for the angular velocity mode and/or for the torque mode. Open-loop control can be used for the angular velocity mode and/or for the torque mode.

The method can further include performing on-board measurements of one or more parameters selected from the group consisting of: torque, axial load, fluid pressure, temperature, acceleration, inertial robot orientation, and robot orientation with respect to an external magnetic field.

The robot can be powered according to a method selected from the group consisting of: providing an on-board battery, and optically transmitting power to the robot.

The method can further include performing one or more operations selected from the group consisting of: on-board data logging, on-board data transmission, providing active buoyancy control, providing a robot turning capability with a linkage between the first part and the second part, and providing a robot turning capability by shifting weight within the robot.

The method can further include measuring a robot rotation rate relative to an external frame of reference using a signal provided from the external frame of reference that is received by a sensor on the robot.

B) Detailed Example

B1) Introduction

Owing to their microscopic size and the very viscous fluids in which they are commonly immersed, microorganisms live in a world where fluid inertia is effectively non-existent, i.e. they swim at zero Reynolds number. As Purcell described in his famous talk "Life at low Reynolds number", the fact that microswimmers move at Re=0 sets extraordinary constraints on the types of swimming strategies, or "gaits", they can adopt. For example, it is well known that swimmers trying to move via reciprocal motion in Stokes flow, wherein the swimming stroke is identical when viewed forwards and backwards in time, exhibit zero net propulsion. These constraints all originate from the fact that the Stokes equations (i.e. the governing equations for Stokes flow) are linear, in contrast to the highly nonlinear Navier-Stokes equations that govern flows with inertia. To overcome the aforementioned constraints, real microorganisms utilize geometric asymmetries or other nonlinear interactions (e.g. employing a flexible rather than rigid tail) to enable propulsion at Re=0. One interesting example of this is propulsion that is enabled by nonlinearities present in the stress-strain relationship of the surrounding fluid itself. For example, if the surrounding fluid is viscoelastic, then propulsion mechanisms forbidden in Newtonian Stokes flow suddenly become possible in this non-Newtonian fluid.

For example, others have demonstrated experimentally that the scallop shape discussed by Purcell actually can swim when placed in non-Newtonian (shear-thinning and shear-thickening) fluids. Propulsion driven by fluid elasticity (i.e. nonlinear elastic stresses) has also been demonstrated through reciprocal motion of an artificial "dimer" and "two-sphere" swimmer respectively.

Another example (Pak et al., 2012) is where an object having two spheres of unequal sizes (resembling a snow-man) is made to rotate in a viscoelastic fluid through the use of an external magnetic field. They find through theory, simulations, and experiments that such an object exhibits zero propulsion in a Newtonian fluid at Re=0 but is able to break symmetry and propel in the direction of the smaller sphere when placed in a viscoelastic fluid.

This two-sphere work by Pak et al. motivated prior theoretical work by some of the present inventors (Binagia et al., 2021). In that theoretical work, it is demonstrated that, if two spheres at a fixed distance were allowed to swirl about the axis through their centers such that there was no net torque or force on the combined bodies, they would be propelled in a viscoelastic fluid in the direction of the larger sphere. That is to say the propulsion was opposite that of the "snowman" of Pak et al. This followed since the no torque condition generally means the smaller sphere (the "tail") must swirl faster than the larger sphere (the "head") by approximately a factor of the cube of the radius ratio of the two spheres. In addition, this theoretical work demonstrated that the propulsion in the case of freely suspended, swirling objects was not limited to the two-sphere configuration, but could involve any bodies of revolution as well as multiple "tails".

Pak et al. had described in their paper that the externally rotated "snowman" could be used as a rheometer since a measure of the propulsion toward the smaller sphere was related to the normal stress in the fluid. Subsequent studies examined how rotationally asymmetric objects (e.g. helical solid-bodies) rotated by external magnetic fields may also be used to measure normal stress and viscosity in complex fluids. The recent theoretical work of Binagia et al. regarding freely suspended, rotationally-symmetric "swirlers" opened the possibility of the development of autonomous swirling robotic rheometers, which is the subject of the present work.

We present a robotic swimmer that not only leverages non-Newtonian rheology to propel itself in a viscoelastic fluid, but it does so as a freely suspended swimmer. This swimmer has two counter-rotating spheres of unequal sizes; the relative rotation rate of the two spheres is prescribed via an on-board microcontroller as opposed to the body being rotated rigidly via an external field. Because our swimmer is thus both force- and torque-free, we believe it can more faithfully capture the swimming dynamics of biological microswimmers. An additional benefit to truly torque-free designs is that these devices are highly portable, requiring little to no infrastructure to operate. Moreover, temporal changes in the response of the swimmer can be reflective of changes in the environment, such as spatial gradients in fluid properties. Finally, as will be shown, the rotation of the head and the forward propulsion speed of the swimmer are directly related to important rheological properties of the surrounding fluid. The device is therefore not only an interesting model of a low Reynolds number swimmer, but also may be used as a portable, rheological probe in different fluid environments.

B1.1) Theory and Numerical Simulations

Figure 1B:
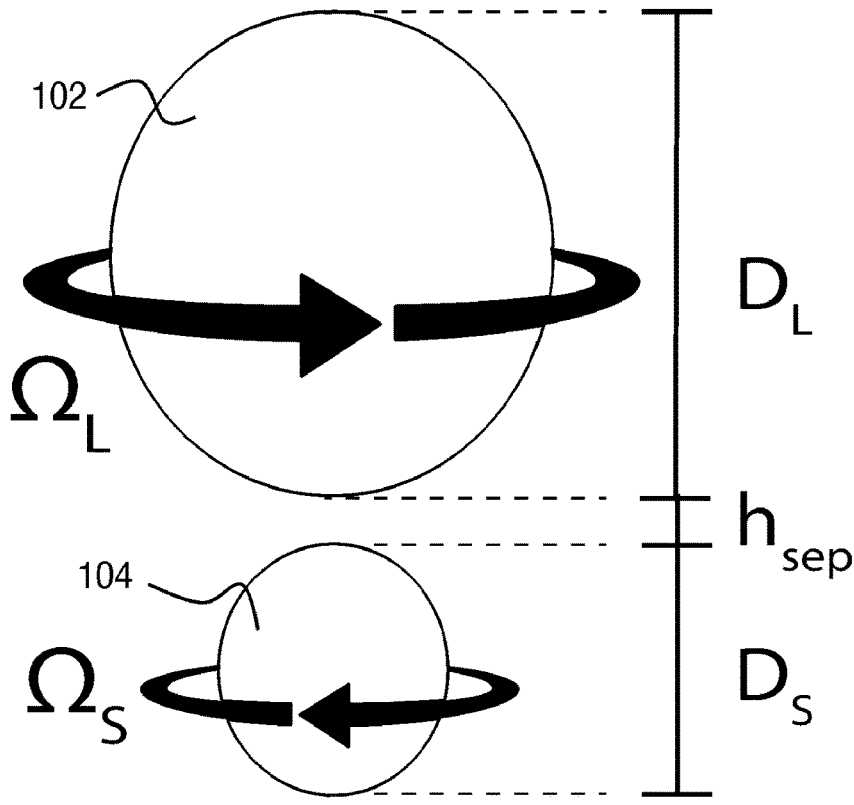
Figure 1C:
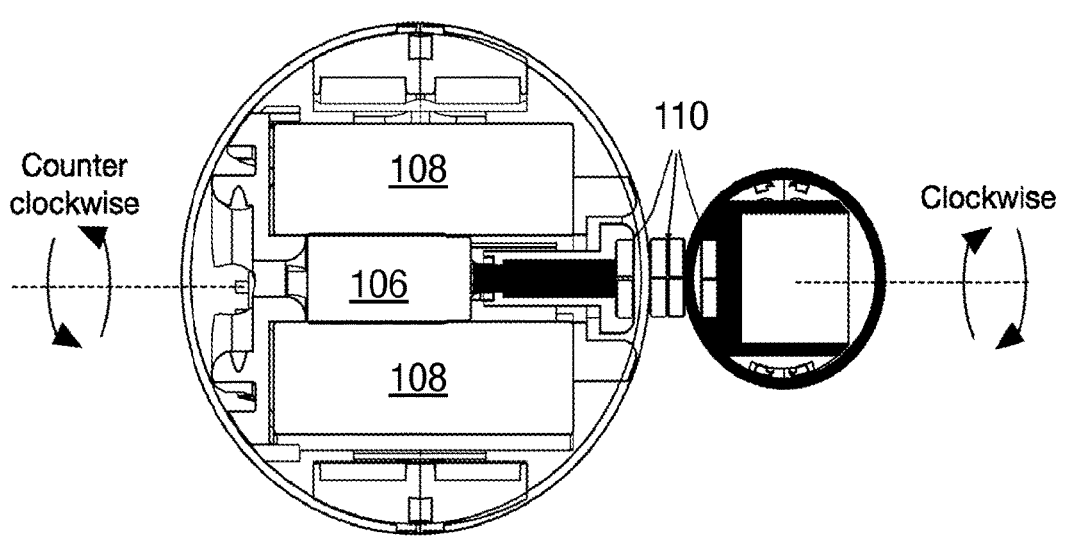

FIG. 1A schematically shows the design of an exemplary rotationally-symmetric swimming robot having head 102 and tail 104. FIG. 1B is an illustration of the model two-sphere swimmer considered in the asymptotic theory and numerical simulations. The axis of revolution or the vertical direction in this figure is taken to be the z direction (imagining a cylindrical coordinate system centered at the center of the swimmer). FIG. 1C shows a motor 106 placed in the head that drives the head and tail to counter-rotate. The motor rotates a drive shaft within the head, which is magnetically coupled to the tail with magnets 110. The device is battery powered (with batteries 108) and has closed-loop speed control.

To model the motion of our robotic swimmer via theory and numerical simulations, we adopt the model illustrated in FIG. 1B. The model swimmer has two spheres of unequal size, whose diameters are $D_L$ and $D_S$ respectively. The spheres are separated by a distance $h_{sep}$ and the magnitude of the rotation rates for the two spheres are $\Omega_L$ and $\Omega_S$ respectively. The motion of the fluid is governed by conservation of momentum and mass at zero Reynolds number, written in dimensionless form as $\nabla \cdot \sigma = 0$ and $\nabla \cdot u = 0$ respectively, where u is the fluid velocity and $\sigma$ is the Cauchy stress. Note that both the equations above and those that follow are made dimensionless by scaling lengths by the radius of the large sphere $R_L$, time by the inverse of the smaller sphere's rotation rate, $\Omega_S^{-1}$, velocities by the product $R_L \Omega_S$, and stresses by $\mu_0 R_L^2 \Omega_S$, where $\mu_0$ is the total zero-shear solution viscosity. Because the fluid is viscoelastic, we write the total stress $\sigma$ as the sum of a Newtonian and polymeric contribution: $\sigma = -pI + \beta(\nabla u + \nabla u^T) + \tau^p$, where p denotes pressure, $\tau^p$ is the extra stress coming from deformation of polymer molecules in the fluid, and $\beta = \mu_s/(\mu_s + \mu_p) = \mu_s/\mu_0$ is the ratio of the solvent viscosity $\mu_s$ to $\mu_0$ (for a fluid with polymer viscosity $\mu_p$).

We use the Giesekus constitutive equation to describe the extra polymer stress $\tau^p$:

$$\tau^p = \frac{1-\beta}{De}(c-I), \quad De \overset{\nabla}{c} + (c-I) + \alpha_m(c-I)^2 = 0. \qquad (1.1)$$

In the above equation, c is the conformation tensor and $\overset{\nabla}{c} = \partial c/\partial t + u \cdot \nabla c - \nabla u^T \cdot c - c \cdot \nabla u$ is the upper-convected derivative. $De = \lambda \Omega_S$ is the Deborah number, which describes the relative importance of elastic effects in a viscoelastic fluid with relaxation time $\lambda$.

If the Giesekus mobility parameter $\alpha_m$ is chosen to be equal to zero, the simpler Oldroyd-B model is recovered, which models the polymer molecules in the fluid to be Hookean dumbbells. Nonzero values of $\alpha_m$ allow the Giesekus equation to predict more realistic rheological behavior such as shear-thinning and nonzero second normal stress differences.

In our previous work (Binagia et al. 2021), the above set of governing equations were solved alongside the appropriate boundary conditions (i.e. $u(r \rightarrow \infty) = 0$ and no-slip at the surface of the rotating spheres) and constraints (that the swimmer is net force- and torque-free) via both numerical simulations and a far-field asymptotic theory valid for small De. Since the present work is largely focused on the experimental realization of the ideas presented in Binagia et al. 2021, only a brief summary of the numerical and theoretical methodology (emphasizing key results and differences from our prior work) will be presented; we refer the interested reader to Binagia et al. 2021 for further details on the numerics and asymptotic theory.

In brief, the numerical solution considers the co-moving frame of reference such that a body-fitted mesh may be considered around the swimmer (with increasing mesh resolution near the swimmer). Mesh convergence studies have been performed to ensure the robustness of our results. The flow solver used is a highly-accurate (third-order) finite volume flow solver developed at Stanford that has been validated for a wide range of problems, including viscoelastic flows and active swimmers. The swimmer's speed U and head rotation rate $\Omega_L$ are determined through an iterative process at each time step such that the swimmer is force- and torque-free. In Binagia et al. 2021, a large cylindrical domain was used such that there were no appreciable hydrodynamic interaction between the swimmer and walls (to facilitate comparison to the theory, which assumes an unbounded fluid). In contrast, a rectangular domain is used in the present work, with the width of the domain W chosen to match the relative confinement ($C = 2R_L/W$) of the robotic swimmer used in the experiments.

In Binagia et al. 2021, an approximate asymptotic theory valid for small De was devised to validate the numerical computations and to provide insight into the physics of the swimming motion. In short, the steps taken to derive such an approximate solution for the swimmer's speed involve considering the O (De) disturbance flow created by each rotating sphere, using Faxen's law to compute the force exerted on each sphere from the disturbance flow of the other, and finally balancing these forces with the drag on the overall swimmer (since the sum of the forces must sum to zero) to solve for the swimming speed U.

While Binagia et al. 2021 performed these steps in the context of the Oldroyd-B constitutive equation (eq. (1.1) with $\alpha_m = 0$), a more general result can be obtained by considering the second-order fluid (SOF) model. The SOF model, which applies to slowly varying flows, is derived by applying the retarded motion expansion to a given flow and retaining terms quadratic in the velocity gradient. The deviatoric stress, i.e. $\tau = \beta(\nabla u + \nabla u^T) + \tau^p$, for the SOF model is given by:

$$\tau = \dot{\gamma} - De_{SO}(\overset{\triangledown}{\gamma} + \beta\dot{\gamma} \cdot \dot{\gamma}),$$

where $$\dot{\gamma} = \nabla u + \nabla u^T,$$

$De_{SO} = (\psi_1 \Omega_S)/(2\mu_0)$ is the Deborah number defined for the SOF model, $B = -2\psi_2/\psi_1$, and $\psi_1$ and $\psi_2$ are the first and second normal stress coefficients respectively. Note that because $\lambda = \psi_1/(2\mu_p)$, $De_{SO} = De(1-\beta)$.

Thus, considering the leading-order O (De) disturbance flow created by each sphere rotating in a SOF fluid, the following general result for U is obtained:

$$U = De_{SO}(1-B)f(r^*, h^*, \Omega^*) \qquad (1.2)$$

where $f(r^*, h^*, \Omega^*)$ is a function that depends on the particular geometry and kinematics of the swimmer: $r^* = R_S/R_L$ is the ratio of the radii of the two spheres, $h^* = h_{sep}/R_L$ is the dimensionless distance between the two spheres, and $\Omega^* = \Omega_S/\Omega_L$ is the ratio of their respective rotation rates. Note that the swimming speed in an Oldroyd-B fluid (i.e. the expression found in Binagia et al. 2021) can be recovered by setting $\psi_2 = 0$ (i.e. $B = 0$) and noting $De_{SO} = De(1-\beta)$.

We can rewrite eq. (1.2) such that the first and second normal stress coefficients of the fluid, $\psi_1$ and $\psi_2$, appear as dependent variables:

$$\psi_1\left(1 + \frac{2\psi_2}{\psi_1}\right) = \frac{2U'\mu_0}{\Omega_S^2 R_L f(r^*, h^*, \Omega^*)} \qquad (1.3)$$

where U' is the dimensional swimming speed. From this equation, one can clearly see how the elastic properties of the fluid ($\psi_1$ and $\psi_2$) can be determined from a measurement of the robot's speed U' for a prescribed tail rotation rate $\Omega_S$. We note that for most polymeric fluids of interest $|\psi_2|/$ $\psi_1 \ll 1$ (a common heuristic is $\psi_2 = -0.1\psi_1$), and so the left-hand side of eq. (1.3) simplifies to just $\psi_1$. Thus, assuming $\psi_2 \approx 0$, one can directly measure $\psi_1$ so long as the viscosity $\mu_0$ is known.

Alternatively, one can also determine both $\psi_1$ and $\psi_2$ simultaneously by measuring both the swimmer's speed U' and the rotation rate of the head (which itself will depend on the rheology of the fluid) for a single experiment. This fact can be appreciated by deriving an asymptotic expression for the head rotation rate directly in terms of $\psi_1$ and $\psi_2$ (in a process identical to that done for the swimming speed but now balancing torques rather than forces acting on the swimmer):

$$\overline{\Omega}_L = r^{*3} \frac{\left(1 - \frac{1}{(1 + r^* + h^*)^3} - \frac{2(\Psi_1 \Omega_S/(2\mu_0))^2}{15}\left(1 - 2\Psi_2/\Psi_1\right)^2\right)}{1 - \frac{r^{*3}}{(1 + r^* + h^*)^3}} \quad (1.4)$$

where we have defined a dimensionless head rotation rate $\overline{\Omega}_L = \Omega_L/\Omega_S = 1/\Omega^*$. Note that if we take the limit of $h^* \to \partial$ and $De_{SO} = 0$, we can confirm $\overline{\Omega}_L = r^{*3}$ (which is the expected result in the case of a Newtonian fluid with zero hydrodynamic interactions).

Thus, just as was the case for eq. (1.3) and the swimming speed, we now have a direct relationship between the head rotation rate and rheological parameters of the fluid. This means that if, for example, the viscosity of a fluid is known, eq. (1.3) and eq. (1.4) can be solved simultaneously as a system of two equations for the variables $\psi_1$ and $\psi_2$ after measuring the swimming speed and head rotation of our swimmer for a prescribed tail rotation rate. We point out that the potential to measure both $\psi_1$ and $\psi_2$ is especially exciting in the field of rheology where traditionally measurements of $\psi_2$ have proved quite challenging, requiring both fine instrument sensitivity (since typically $|\psi_2| \ll \psi_1$) as well as unique instrument configurations. Furthermore, recently proposed methods for measuring the normal stress coefficients, e.g. measuring the speed of a rotating dumbbell (Pak et al. 2012) or the relative force between two microrheological probes, require that two independent measurements be made to compute both $\psi_1$ and $\psi_2$; in contrast, both $\psi_1$ and $\psi_2$ can be computed from a single experiment in our methodology since we can observe simultaneously two measurable quantities (speed and head rotation rate) that each depend on the rheological parameters of the fluid in a distinctive, independent manner (i.e. comparing eq. (1.3) and eq. (1.4)).

Lastly, while the theoretical expressions derived above were derived in the context of a single-mode fluid, the extension to a multi-mode model is straightforward. The effect of the multiple modes can be shown to be additive, such that their impact on the swimming speed is completely captured by the mean of their individual effects. Put more precisely, the swimming speed for the swimmer immersed in a multi-mode fluid is given by eq. (1.3) but with the Deborah number De now defined in terms of the average relaxation time ($\overline{\lambda}$) of the fluid via $De = \overline{\lambda}\Omega_S$. This allows us to make direct comparisons between experimental data, where the fluid is fit to a multi-mode constitutive equation, and theory using a single-mode fluid.

B1.2) Description of Experiments

Figure 2A:
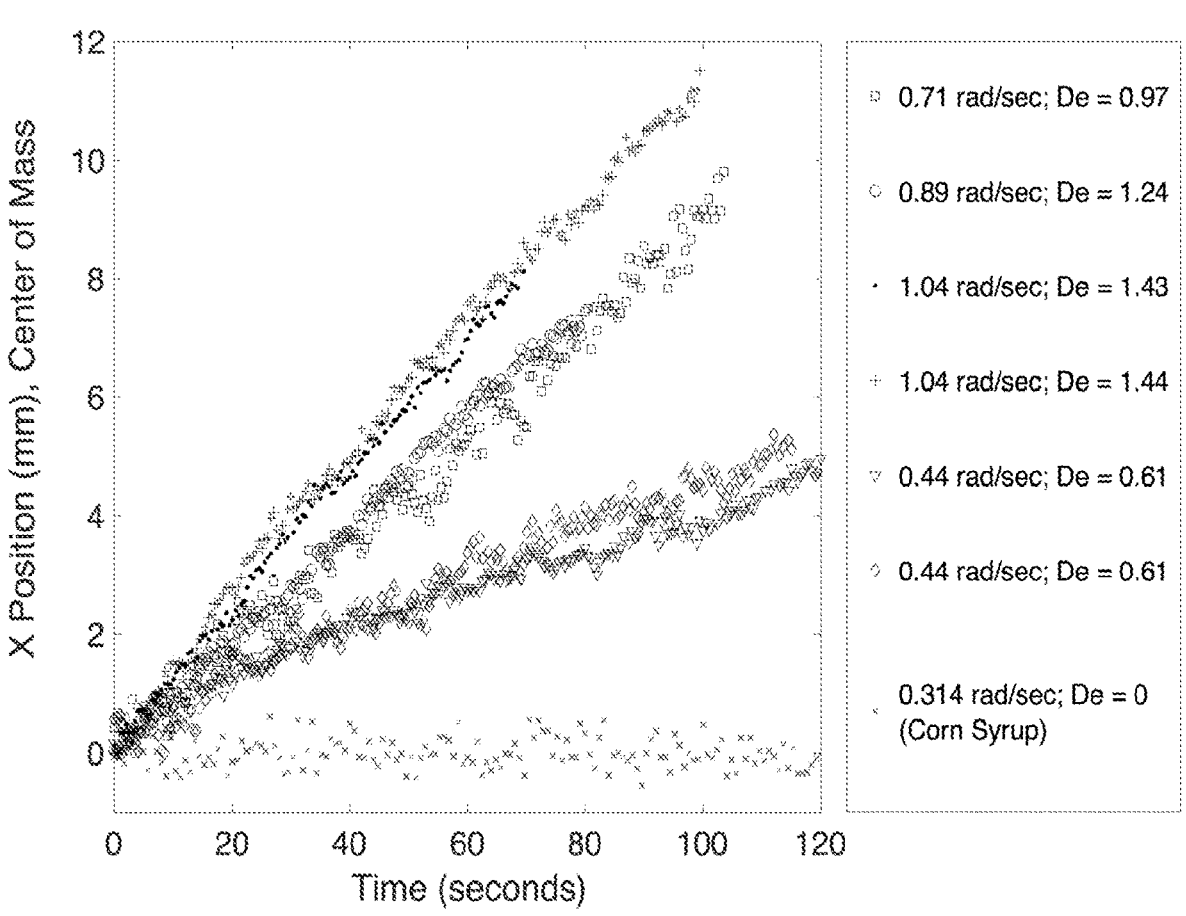
FIG. 2A is an experimental plot of robot position vs. time under various circumstances.
Figure 2B:
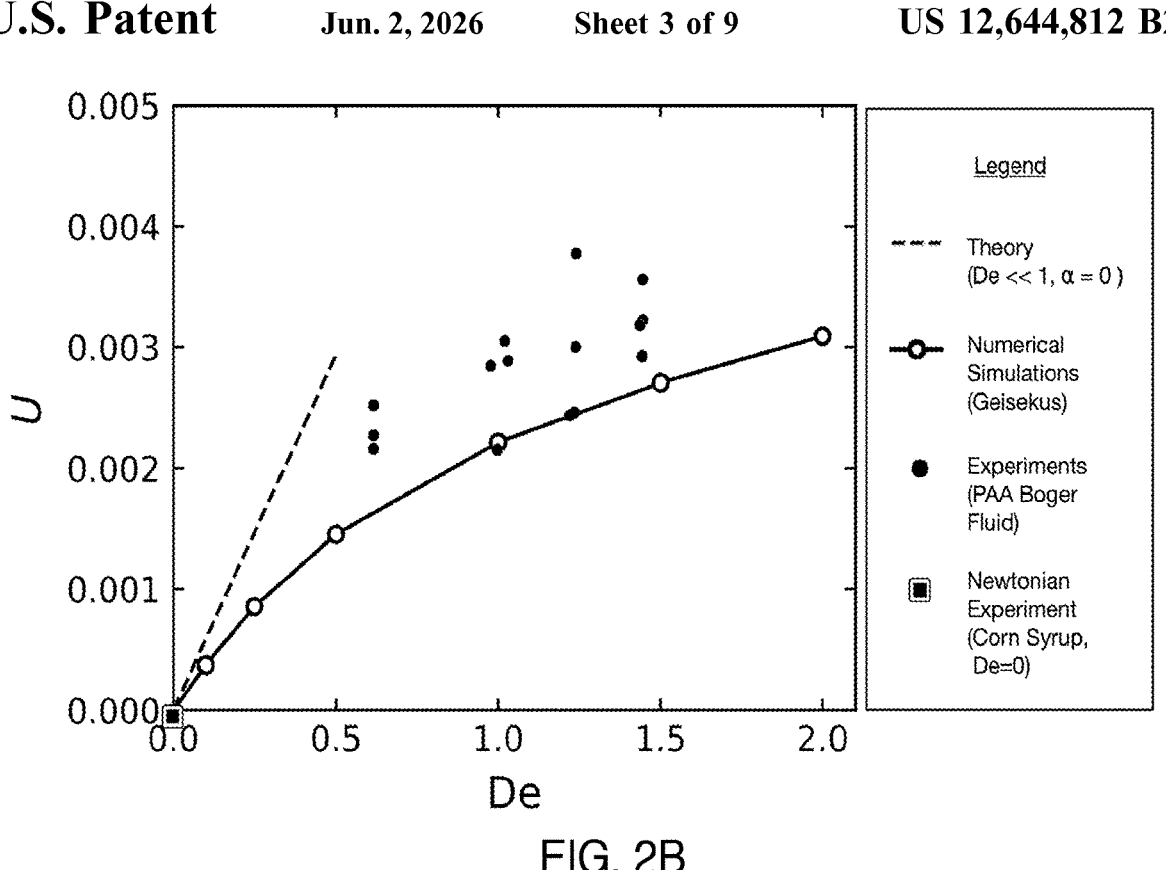
FIG. 2B is a comparison of theory to experiment for robot speed in various circumstances.

Image analysis (circle detection) was used to determine the trajectory of the swimmer (and thus its propulsion speed)

as a function of time. FIG. 2A shows the resulting coordinates of the robot center of mass as a function of time for different tail rotation speeds. FIG. 2B shows dimensionless swimming speed U as a function of the Deborah number, De. The asymptotic theory, valid for small De, is shown as the dashed line and assumes an infinite domain and zero shear-thinning in the fluid. Experimental data is shown as the filled-in circular markers. Simulations (open circles) are performed with a multi-mode Giesekus model (which allows for shear-thinning and second normal stress differences in the fluid), with the mesh domain defined to approximately match the size of the experimental tank (the confinement ratio $C = 2R_t/W = 0.32$).

A small robot was constructed that is capable of untethered self-propulsion in viscoelastic fluids (FIG. 1C) at low Re (Re=0.1-1). The robot was designed in two modules: the head (spherical, 70 mm diameter) and a number of tails (most emphasis here is on the 30 mm diameter spherical tail). The counter-rotation between the head and tail was achieved via a stepper motor and micro-controller placed in the head. The propulsion of the swimmer was tested in several fluids. For each fluid, the robot was tuned for neutral buoyancy and center of mass location, such that it can swim predominantly horizontally (e.g. propulsive thrust and gravity are approximately perpendicular to one another). Particularly, we confirmed that zero self-propulsion was observed in a viscous Newtonian fluid, i.e. corn syrup (c.f. FIG. 2B, black square). To test the swimmer in viscoelastic fluid, approximately 3 gallons of a polyacrylamide-based "Boger" fluid was prepared so as to minimize the degree of shear-thinning present in the fluid and thus to isolate the effects of fluid elasticity on propulsion. The composition of our Boger fluid was 92.5% corn syrup (Karo syrup), 7.4% deionized water, and 0.1% polyacrylamide (MW=5×106 g/mol) by weight. The rheology of the fluid was measured using an ARES-G2 rheometer. A fit to the stress relaxation after a step-strain yielded a longest relaxation time of $\lambda_{long} \approx 2.51$ s. A multi-mode fit to the small-amplitude oscillatory shear (SAOS) data using 3 modes (n=3) yields a solvent viscosity $\mu_s = 2.05$ Pa s, a zero-shear solution viscosity $\mu_0 = 4.46$ Pa s, a viscosity ratio $\beta = 0.46$, and an average relaxation time $$\overline{\lambda} = \left(\sum_{i=0}^{n} \lambda^{(i)} \mu_p^{(i)}\right) \Big/ \left(\sum_{i=0}^{n} \mu_p^{(i)}\right) = 1.38 \text{ s}.$$

A Giesekus mobility parameter for each mode, $$\alpha_m^{(i)},$$

was determined through a fit to the shear rheology data (specifically $\psi_1$), yielding $$\alpha_m^{(0)} = 0.2, \ \alpha_m^{(1)} = 0.0002,$$

and $$\alpha_m^{(2)} = 0.1996.$$

Note that for the single-mode Giesekus equation, $\beta=-2\psi_2/\psi_1=\alpha_m$, showing that a fluid with a nonzero value of $\alpha_m$ not only exhibits shear-thinning but also exhibits a nonzero second normal stress difference. Lastly, a power-law fluid model was fit to the shear viscosity data to ascertain the degree of shear-thinning present in the fluid. A shear-thinning exponent of 0.93 was found, indicating a very modest degree of shear-thinning present in the fluid. Based on this and on the fact that the largest shear rate experienced in the robot experiments is $\dot{\gamma}_{max}=2\Omega_S\approx2$ rad/s (i.e. the shear rate present at the equator of the small sphere), we conclude that this fluid meets our criteria for an elastic fluid with minimal shear-thinning.

B2) Results

B2.1) Characterization of Propulsion Speed

As described in the preceding section, the swimming speed of the robot is directly related to the elasticity of the fluid. It is critical then to assess how the speed of the robotic swimmer compares to that predicted by theory and simulations since the latter two may then be used to infer properties of the fluid based on observed swimming speeds. In FIG. 2B, the dimensionless swimming speed of the robot U is plotted as a function of the Deborah number (De) of the fluid, $De=\bar{\lambda}\Omega_S$. Experimental data, shown as the filled-in circles in FIG. 2B, is plotted alongside our small De asymptotic theory (dashed line) and our numerical simulations (open circle markers). To compare to experiments, both the theory and simulations take as input the specific geometry of the robotic swimmer and the rheology of the fluid: $h^*=0.17$, $r^*=0.43$, $\bar{\lambda}=1.38$ s and $\beta=0.46$.

Some minimal scatter in experimental data arises from our imaging system (e.g. camera attempting to refocus due to presence of bubbles, etc.) and image analysis (lighting, shadows). Transient effects from the swimmer starting and stopping are cropped prior to analysis and we focus only on regions of steady operation. Raw data in FIG. 2A demonstrates that the propulsive effects are very linear for $De\approx0.5$ to 1.5, while the robot is operating at a constant rotation rate, indicating that the transient effects are minimal in this De range.

From FIG. 2B, we observe that both experiments and simulations predict a modest increase in dimensionless swimming speed as a function of the Deborah number De. The asymptotic theory agrees with numerical simulations for small De, but the two depart as De increases. Note that the De at which the two depart from one another is smaller than that in Binagia et al. 2021 since the present simulations account for shear-thinning present in the fluid and swimmer confinement effects, both of which are neglected in the prior theory. We remark that the asymptotic theory for the swimming speed could also be improved by considering higher-order terms in the series expansion, e.g. terms of O ($De^2$), through computation of the surrounding flow field through O ($De^2$). The good agreement between simulations and experiments serves as a validation for the computational model and thus allow us to make claims about the propulsion mechanism through an analysis of the numerical results.

B2.2) Propulsion Mechanism

The propulsion mechanism of this device is directly related to the first normal stress coefficient (e.g. see eq.

(1.2)). However, it is not immediately clear how normal stresses in the fluid are mechanistically generating swimmer thrust.

Figure 3A:
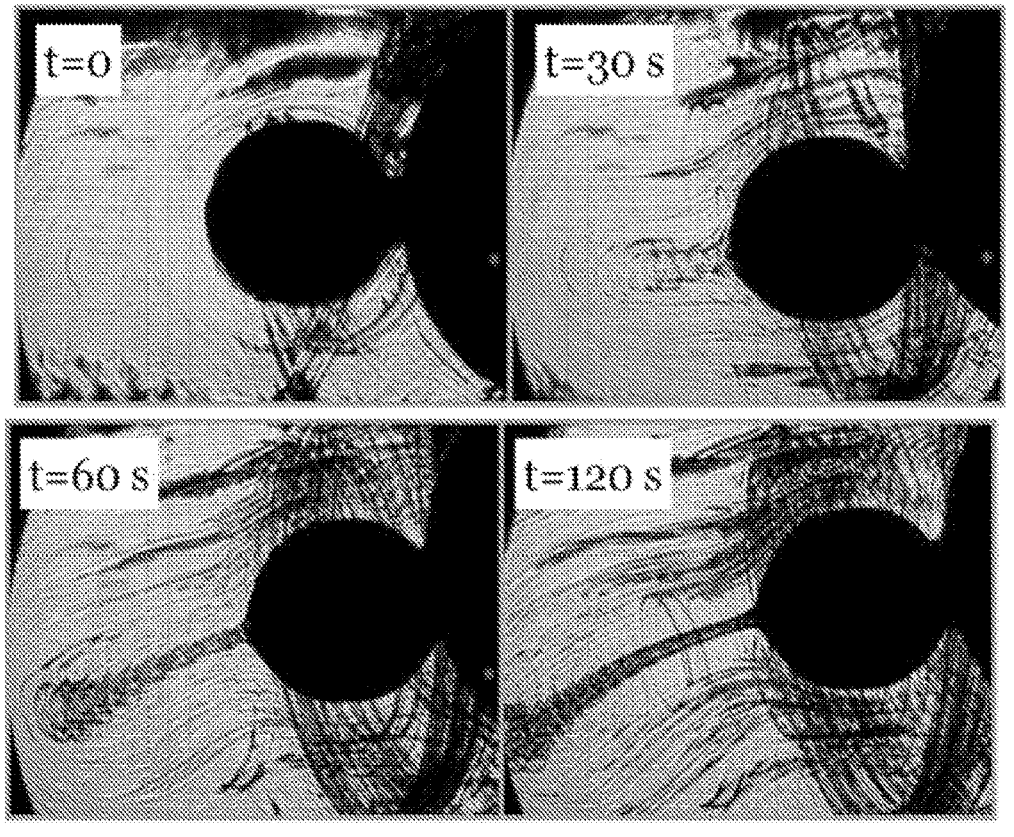
FIG. 3A are Schlieren images of the robot in operation at several times.
Figure 3B:
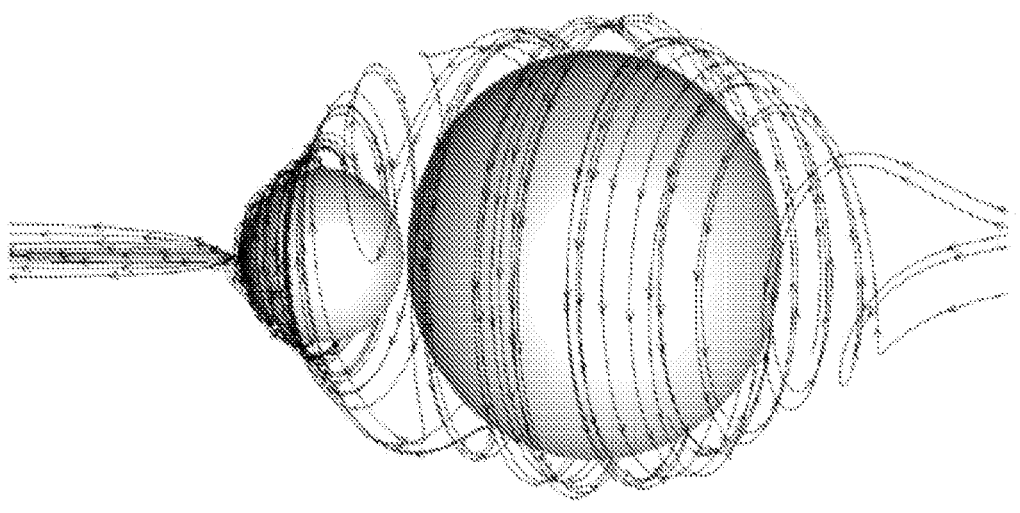
FIGS. 3B-C are flow simulation results showing the effect of fore-aft asymmetry (or symmetry) on jet formation.
Figure 3C:
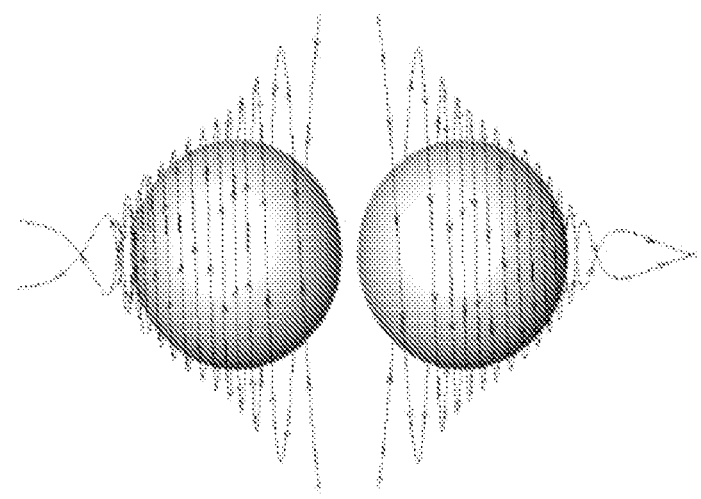

FIG. 3A shows Schlieren imaging of features of the flow field in experiments. Shortly after the rotation of the small sphere is initiated (t=0, t=30), we observe the formation of hoop-like strands around the small sphere and the creation of a slender jet-like structure at the pole of the small spherical tail. As time progresses (t=60), the jet is seen to persist and grow in length. Even at long times (t=120), this jet structure is still present behind the rear of the swimmer. FIG. 3B shows numerical simulations of the streamlines of the flow that also indicate the presence of an elastic jet. Parameter values used are $\beta=0.46$, De=2, $r^*=0.43$, and $h^*=0.17$. The simulation of FIG. 3C shows that when the head and tail are identical in size, the same jet structures appear both at the head and tail.

To investigate further, we imaged the robot using a slightly modified Schlieren imaging set-up. As shown in FIG. 3A, features of the flow indicate that a narrow viscoelastic jet develops behind the tail of the robot over a period of tens of seconds. Significant flow in the azimuthal direction (i.e. around the spinning tail) is also visible as dark strands around the small sphere; such flow is predicted to generate regions of large hoop stress around the tail of the swimmer.

Numerical simulations indicate a set of fluid structures that match those seen in the experiments (FIG. 3B). Simulations suggest that while hoop stresses seem to dominate the polymer stress, a non-negligible polymer stress develops along the swimming direction $$(\tau_{zz}^p)$$

in the region of the viscoelastic jet, precisely where a large pressure wake shown to drive propulsion is located.

While the elastic properties of the fluid enable the robot to propel itself, it is the interaction between the solid bodies (specifically, in the context of an asymmetry between the head and the tail) and the nonlinearity of this viscoelastic fluid that enable it to form a primary jet and region of high pressure behind the tail. FIG. 3C demonstrates this concept, showing that when the head and tail are of equal size, there exist two such jets also of equal size, and each expel fluid from the head and tail, with no net propulsion. Fundamentally, the formation of each jet is a manifestation of the Weissenberg effect.

B2.3) Geometric Optimization

In the interest of maximizing the propulsion of our robotic swimmer, we conducted numerical simulations for a range of tail shapes and geometries. Since the speed is the primary signal used in inferring the rheological parameters of the fluid when using the robot as a fluid sensor, maximizing the speed for a given relative rotation rate and fluid rheology is equivalent to maximizing the signal-to-noise ratio of the robot as a measurement device.

Figure 4:
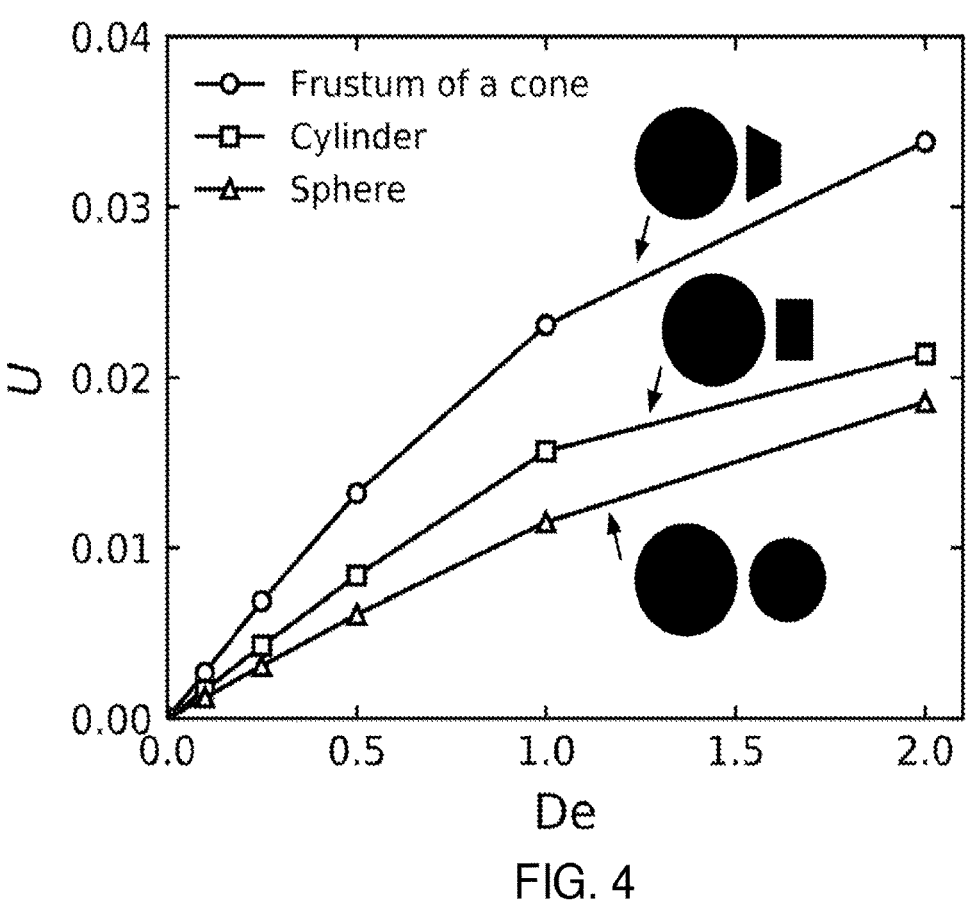
FIG. 4 shows the effect of tail shape on robot speed.

FIG. 4 shows dimensionless swimming speed U as a function of De for various tail shapes. For all De, the swimmer with optimal cylindrical tail ($R_{cyl}/R_H=0.86$ and $H_{cyl}/R_H=0.51$ where $R_H$ denotes the radius of the spherical head) is faster than that with the optimal spherical tail ($r^*=0.75$). Likewise, the swimmer with the optimal conical frustum tail ($R_{1,f}/R_H=1.0$, $R_{2,f}/R_H=0.31$, $H_f/R_H=1.1$, where $R_{1,fr}$ is the radius closest to the head) is faster than that having the cylindrical tail for all De. In contrast to the dependence on the radii, the dependence of U on the length of the cone is much less substantial. The insets depict the optimal geometry for each shape family.

Three distinct tail shapes were considered in this process: spherical tails, cylindrical tails, and conical tails (specifically, cones with the tip of the cone removed, otherwise known as a conical frustum). Sequential least squares programming was used to determine which tail geometries to simulate, with the algorithm proceeding until a local maxima was reached in the swim speed. Note that the optimal shape of the sphere (i.e. r*=0.75) has been determined in prior work (Binagia et al. 2021). To reduce the computational cost of the optimization procedure, the single-mode rather than multi-mode Giesekus equation was used, with the same value of β=0.46 but now with $\alpha_m$=0.035 (determined from fitting the single-mode model to the shear rheology data). These locally optimal shapes where then used to determine the swimmer's speed as a function of De, as shown in FIG. 4. We see that for all De, the speed of the optimal cylindrical tail is strictly greater than the optimal spherical tail; likewise, the speed of the conical frustum is always greater than that of the cylindrical tail. This figure suggests that the swimming speed of the robot with an optimal spherical tail could be more than doubled by constructing a tail in the shape of a frustum.

It is noted that the conical tail shape itself contains a fore-aft asymmetry (therefore may be generating its own net-propulsive flow), whereas the cylindrical and spherical tail shapes are generating their propulsion only via flow interactions with the head. At these low Re (<<1) and weak De (O(0.1)–O(1)), the spherical or cylindrical tails are not generating any net propulsive force in isolation. This may not be the case at very high De or Re; for example, it has been demonstrated that a sphere rotating at very high De is capable of spontaneous symmetry-breaking. Such effects do not play an important role in this low De regime, but they do suggest that the optimal tail geometry will likely change based on the De range. We expect this would especially be the case in very high De and Re regimes.

B3) Discussion

Figure 5:
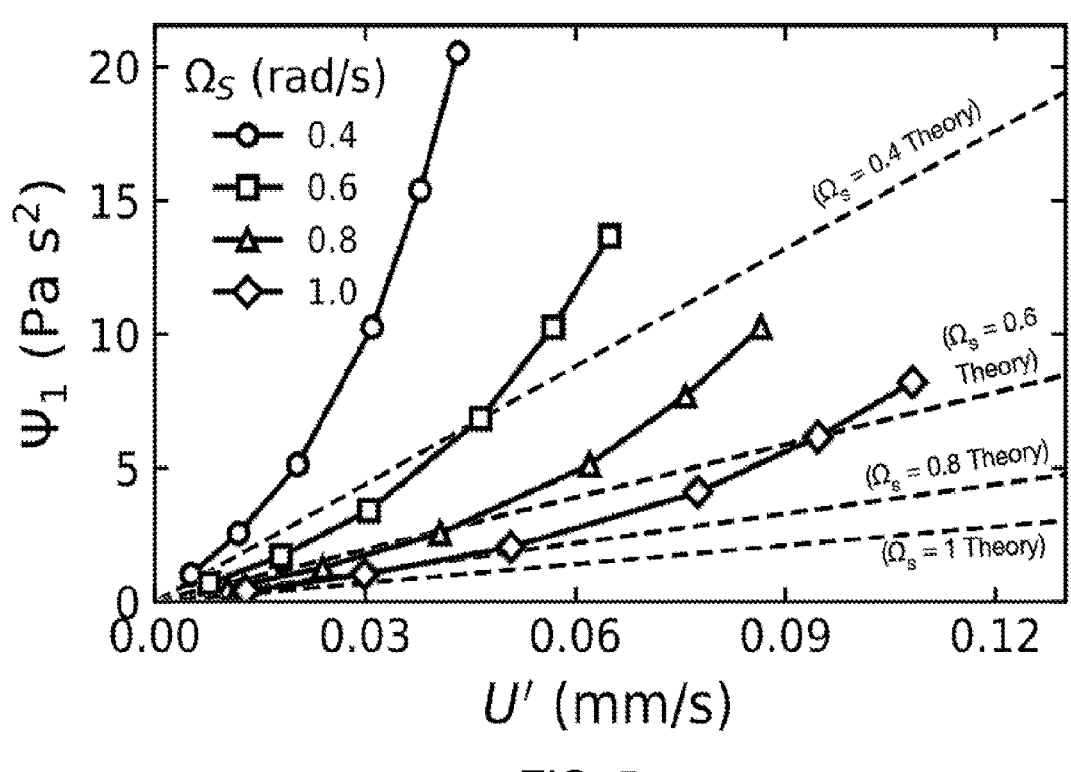
FIG. 5 shows the inferred $\psi_1$ vs. robot propulsion speed for several different rotation rates.

FIG. 5 shows the value of the first normal stress coefficient $\psi_1$ that the robot infers as it is observed to swim at (dimensional) speed U' at a tail rotation rate $\Omega_S$. Here, we consider the viscosity to be known a-priori from independent measurements ($\mu_0$=4.46 Pa s). The dashed lines denote predictions from our low-De theory (i.e. eq. (1.3) with h*=0.17, r*=0.43, and assuming $\psi_2\approx0$). The solid lines and markers are predictions from our numerical simulations using the multi-mode Giesekus equation (i.e. the simulation data shown in FIG. 2B, using the fact that $$\psi_1 = 2\sum \lambda^{(i)}\mu_p^{(i)}$$

for a multi-mode model). This figure illustrates the operating characteristics of the swimming robot in terms of its use as a sensor. For example, operating at a small value of $\Omega_S$ (e.g. $\Omega_S$=0.4) allows the robot to be more sensitive to small changes in U' but necessarily requires a greater experimental resolution of the observed swimming speed.

Mimicking attributes of micro-biological swimmers, we have built an untethered swimmer that passively adapts to propel itself at different speeds, depending on the properties of the surrounding fluid. In this way, the behavior itself acts passively as a sensor to the observer. The functionality of this system implies a clear application: a swimming rheometer. FIG. 5 depicts a design curve, constructed from our simulation data and our theoretical results at low Deborah number. Observation of the propulsive speed of the robot (x-axis) is a direct measure of the first normal stress coefficient. This is exemplified by eq. (1.3), where the rheology parameter we want to infer (i.e. $\psi_1+2\psi_2$) is written directly as a function of observables (the swimmer's speed and tail rotation rate) and known quantities (i.e. the swimmer's geometry, the viscosity of the fluid, etc.). Here the viscosity can be regarded as known a priori, or it can be determined from measurements of the robot (e.g., as in the above-described torque mode). Furthermore, very often it is the case in polymeric fluids that $|\psi_2|<<\psi_1$, so upon assuming $\psi_2\approx0$, eq. (1.3) yields a direct expression for $\psi_1$ based upon swim speed observations of our swimming robot.

To provide a proof of concept for our swimming rheometer, we can compare the inferred values of $\psi_1$ based on the swimmer observations to that which we obtain from a benchtop rheometer. Using eq. (1.3), we obtain predictions of $\psi_1$ (assuming here again $\psi_2\approx0$) equal to 4.3, 3.1, 2.7, and 2.5 Pa $s^2$ for the 4 different tail speeds. It should be emphasized at this point that typical commercial rheometers cannot measure $\psi_1$ at these low shear rates. For this reason, we compare these measured values of $\psi_1$ from our swimming rheometer to that predicted by a multi-mode Giesekus fit at shear rates corresponding to the average shear rate created by a sphere rotating at rotation rate $\Omega_S$. This fit to the benchtop rheometer data predicts the "true" values of $\psi_1$ to be 3.1, 2.2, 1.8, and 1.7 Pa $s^2$. This comparison between our inferred values of $\psi_1$ from experiments and those predicted from a fit to $\psi_1$ measurements taken using a commercial rheometer are in reasonable agreement, considering the assumptions of our asymptotic theory used to derive eq. (1.3), and considering that $\psi_1$ is a dimensional quantity that can range across many orders of magnitude. The eventual miniaturization of such devices could open numerous opportunities for applications in microbiology, environmental sensing and medical diagnostics.

B4) Supplemental Material

B4.1) Robot Design

The 70 mm "head" contains all power and electronics for the system, including a pseudo-closed-loop speed control system consisting of a small stepper motor and gearbox. The initial versions of the robot were constructed within molded polypropylene spherical shells to ensure high geometric precision of the exterior, to match with simulations and theory. Both the head and tail modules required ballast tanks for tuning the buoyancy and center of mass of the robot. These tanks were accessible from the exterior, and use rubber seals, which allow the user to repeatably inject or withdraw fluid from the ballasts at multiple points on the robot).

The head and tail are coupled with a magnetic linker shaft (thus, the design includes no rotary shaft seal). This allows the robot to be highly configurable and modular, specifically allowing for quickly swapping tail attachments without any modification to the robot. Because the system has closed-loop speed control (and is not power-limited), effects of friction in the magnetic linker do not significantly affect the system performance.

The device is powered with small lithium polymer batteries, with an onboard voltage regulator, microcontroller, IR receiver and stepper motor driver. Speed control protocols can be uploaded to the onboard microcontroller, and transmitted during experiments with a modified IR remote control (transmitter modified from 940 nm to 850 nm to avoid significant absorption from the submersion fluid). The robot is capable of receiving signal at significant distances while fully submerged (tested to approximately 0.5 meters without receiver difficulty).

B4.2) Maintaining Neutral Buoyancy

Figure 6:
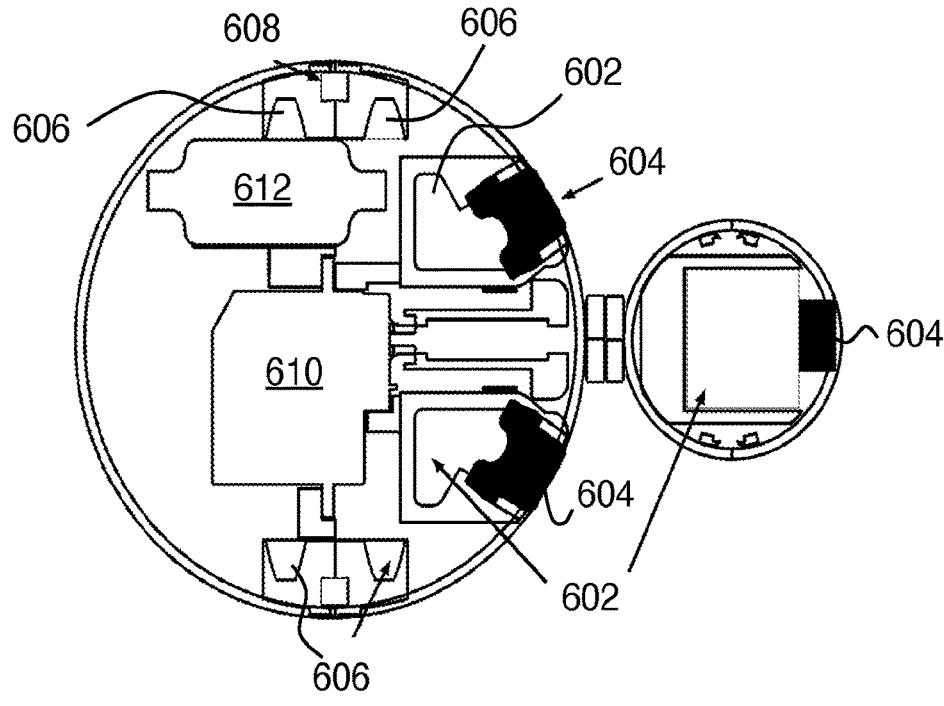
FIG. 6 shows some aspects of robot design.

FIG. 6 shows several optional robot features for buoyancy tuning. Oil ballast tanks 602 are used for fine tuning during experiments, by the user injecting small volumes of oil into the tanks (displacing air) through a rubber stopper 604. Modular tungsten weights are used in the head for large adjustments, but these large adjustments require a moderate amount of disassembly. For completeness, motor 610 and receiver electronics 612 are also shown.

One important design aspect of this device is a practical way to easily/precisely tune its mass. Because the forward motion of the swimmer is a crucial measurement signal, it is necessary to either know the sum of the forces acting on the robot due to gravity and buoyancy a priori—or if this information is not known, it is necessary to tune these forces to be as close to zero as possible prior to use.

In our prototype device, we tune the mass of the robot to achieve neutral buoyancy in two stages: gross and fine. In the first stage of gross tuning, the head of the robot is taken apart into two hemispheres. The sphere comes apart in these 2 discrete halves, with a (compressible) rubber gasket 608 at the equator. In each half, there are slots along the interior for tungsten ballast weights 606, and tungsten putty. This allows tuning of mass in the range of approximately of 20-60 g from the initial base weight. This gross mass change allows the device to be tuned for a variety of submersion fluids that vary widely in density.

In the second stage of buoyancy tuning, fine adjustments can be made (on the order of 0.1 grams). This is achieved by adding oil to small tanks 602 on the device. After gross-adjustments (when the device is fully assembled and often submerged in the fluid), a sharp needle is used to penetrate a rubber "vacutainer" seal 604, and oil can be added in the tail or to two locations in the head. The seal self-heals when the sharp is removed and can be used for thousands of use cycles. As the oil tanks themselves are non-compliant, very small and water-tight, a release needle (to allow for air to escape) is also necessary when adding fluid to the oil ballasts. This two-stage method allows for very fine control over the buoyancy of the laboratory prototype, which is necessary to achieve good measurement signal.

The same 2-step buoyancy tuning method is also used on the tail attachments. It is proposed that active buoyancy control would be ideal in this circumstance, although difficult to achieve on such small-scale prototypes (automatically self-adjusting the mass of the swimmer while in use, based on the density of the submersion fluid). For very small-scale device versions, it seems feasible to manufacture a series of devices with unique densities—and subsequently choose the most appropriate device based on the submersion fluid.

B4.3) Center of Mass Tuning: Trim and Stability

In addition to tuning the overall mass of the swimmer, it is necessary to consider the exact position of the center of mass in the robot.

Another way of phrasing this: it is ideal if the distance (along the swimming axis) between the center of gravity and the center of buoyancy is minimized. The center of gravity will be located at the center of mass of the robot (including the mass of the magnetic linker, which is not negligible). The center of buoyancy will be located at the geometric/volumetric center of the robot in a homogeneous submersion fluid; and more generally, at the center of mass of the fluid the device is displacing.

Even if the total mass of the robot is nearly perfectly tuned, the tail will have a tendency to pitch up or down relative to the forward motion vector of the device (especially once the device begins to propel forward), if the relative mass between the head and tail has not also been considered. The presence of these instabilities (further detailed in FIG. 7) decreases/obfuscates the apparent forward propulsion, lowering the accuracy of the device—if not carefully taken into account.

Investigations into the stability of the swimmer are ongoing. We have observed experimentally that tails of larger diameters (0.5 time the head sphere and larger) are far more sensitive to this effect than smaller diameter tails.

Figure 7:
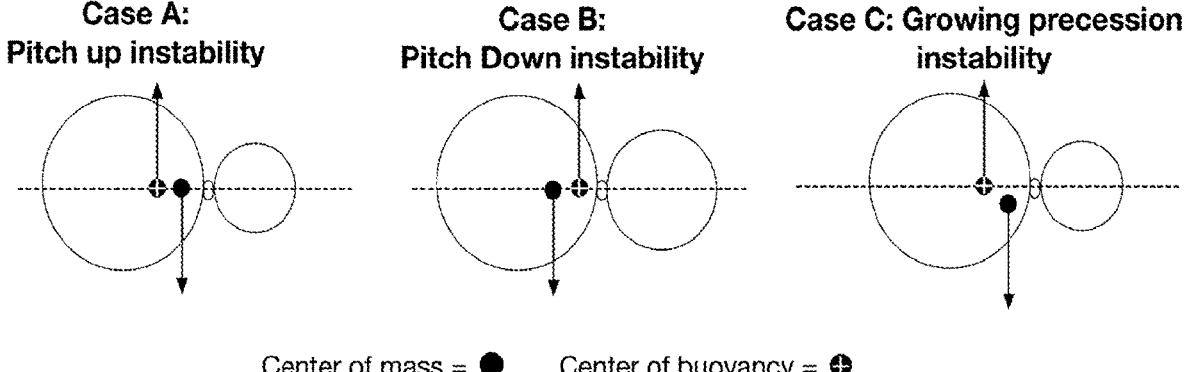
FIG. 7 shows considerations relating to robot buoyancy.

A balancing rig was used just prior to experimental data collection to ensure that the center of mass within the head was precisely centered to avoid the unstable case (c) in FIG. 7.

Figure 8A:
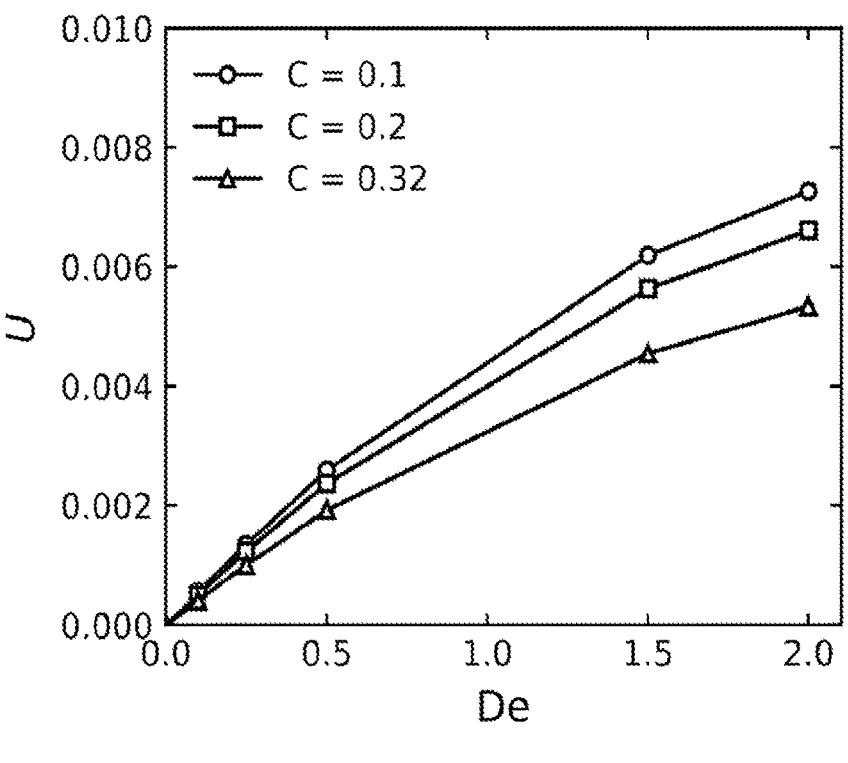
FIG. 8A shows the effect of confinement on the swimming speed.
Figure 8B:
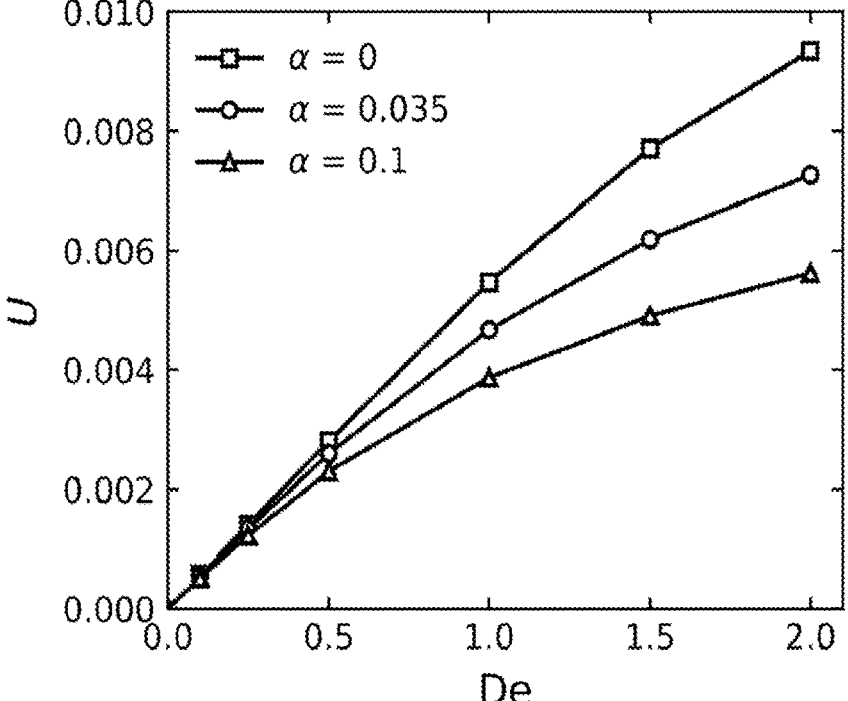
FIG. 8B shows the effect of the Giesekus mobility parameter $\alpha_m$ on the swimming speed.

B4.4) Secondary Effects on the Swimming Speed: Confinement and Shear-Thinning FIG. 8A shows the effect of confinement $C=2R_L/W$ on the swimming speed U. Simulations were performed using the single-mode Giesekus constitutive equation with $\alpha_m$=0.035, $\beta$=0.46, r*=0.43, and h*=0.17. As the confinement around the swimmer increases (i.e. increasing C), the swimming speed is observed to decrease. FIG. 8B shows the effect of the Giesekus mobility parameter $\alpha_m$ on the swimming speed U. For nonzero values of $\alpha_m$, the Giesekus equation exhibits shear-thinning and a nonzero second normal stress coefficient. Simulations for this subfigure were performed using the single-mode Giesekus constitutive equation with C=0.1, $\beta$=0.46, r*=0.43, and h*=0.17. We find that as $\alpha_m$ increases, the speed of the swimmer decreases for all De.

As discussed above, two effects not considered in the numerical simulations of our previous work (Binagia et al. 2021) but now included in the present work are shear-thinning rheology and confinement of the swimmer. From FIG. 8A, we see that as the confinement around the swimmer $C=2R_L/W$ increases, the swimming speed decreases for all De. From FIG. 8B, we see that as $\alpha_m$ increases (corresponding to a larger extent of shear-thinning and larger value of $\psi_2$ for the fluid), the swimming speed decreases for all De. Note that for $\alpha_m$=0, corresponding to the Oldroyd-B constitutive equation, the fluid exhibits zero shear-thinning and $\psi_2$=0. In summary, both increasing confinement and increasing the extent of shear-thinning present in the fluid are seen to decrease the swimmer's speed in a viscoelastic fluid.

B4.5) Tail Shape Optimization Procedure

To complete optimization of propulsion for tail shapes of various geometries, a mesh and timestep convergence study was used to determine the coarsest spatial and temporal dimension that could give a translation speed U within 15% of the finest grid result. To run the geometric optimization, many function evaluations are needed, and so running many simulations at the finest mesh resolution is infeasible. To generate an initial guess for the optimizer, univariate optimizations were run for all the geometric degrees of freedom (i.e., radius and height of a cylinder). A Sequential Least-Squares Programming (SLSP) method was then used with the initial guess to find the global maximum, with a convergence tolerance of $1\times10-4$ with respect to U. The SLSP method estimates the Jacobian of the objective function at a given point to converge quickly to the function's minimum. To confirm the coarse grid results, multiple points were chosen close to the found maximum and were run both on the coarse and fine mesh. This data confirmed that the found maximum on the coarse grid was also a maximum on the fine grid within the chosen convergence tolerance. After the optimization, a sweep of different geometric values was chosen to evaluate the global characteristics of the objective function U and to confirm that the global maximum was found.

B4.6) Using Design Curve to Measure $\psi_1$

Further comments and minor details are included in this section, related to the discussion section in the main text about how this device may (in a very practical sense) be used as an untethered rheometric device.

From FIG. 5, we observe that while the low De asymptotic theory predicts linear design curves, the numerical simulations appear to be nonlinear with respect to the observed speed; this fact can be appreciated by noting that the curve of $\psi_1$ vs. U' is in many ways an inversion of FIG. 2B (i.e. now speed is on the x-axis and a measure of the fluid elasticity is on the y-axis). While the asymptotic theory is advantageous in that it provides a closed-form relationship between $\psi_1$ and the swimmer's geometry, observed speed, etc., its usage should be confined to cases where the assumptions of its derivation hold (i.e. Re=0, De<<1, an unconfined swimmer). In contrast, the curves mapped out by the numerical simulations are valid for finite De and can consider arbitrary levels of confinement; however, they only define an implicit relationship between U' and $\psi_1$. In order to effectively use the numerical simulations to create a mapping between U' and $\psi_1$, curve fitting would be required to interpolate between the points at which simulations were conducted.

One consequence of FIG. 5 is that different robot tail speeds (different values of $\Omega_S$) should reproduce the same rheological property of the fluid, but with different sensitivities. This is related to the operating conditions: a rotation rate should be chosen such that both the sensitivity of the signal and the desired sensing range are taken into account. This design space may be constructed for other, more efficient tail shapes such as the cylinder.

A corollary associated with this operating curve also holds: if maintaining a constant motor speed and the forward propulsion speed changes in time, this indicates a non-homogeneous fluid, where rheological properties of the fluid are changing spatially. This allows an observer to map non-uniform rheological properties within a region.

Here we note some minor details in how we arrived at the inferred values of $\psi_1$ based on our experimental observations. The experimental data points displayed on FIG. 2B correspond to average tail rotation rates of 0.46, 0.73, 0.89, and 1.0 rad/s and swimming speeds of 0.036, 0.070, 0.091, and 0.12 mm/s. Plugging these values into the model, we would obtain respective predictions of $\psi_1$ (assuming here again $\psi_2\approx0$) equal to 4.3, 3.1, 2.7, and 2.5 Pa s$^2$ respectively. It should be emphasized at this point that typical commercial rheometers cannot measure $\psi_1$ at these low shear rates (Morrison et al. 2001). For this reason, we compare our inferred values of $\psi_1$ from our swimming rheometer to that predicted by our multi-mode Giesekus fit at shear rates corresponding to the average shear rate created by a sphere rotating at rotation rate $\Omega_S$.

The average shear rate for a sphere of radius R rotating at rotation rate $\Omega$ at Re=0 is equal to $$\dot{\gamma}_{avg} = \left(\int_0^\pi \left|\frac{du_\phi}{dr}\right|_{r=R}\right| d\theta\right)\left(\int_0^\pi d\theta\right) = 4\Omega/\pi \qquad (3.1)$$

At these shear rates, the fit to the multi-mode Giesekus equation are 3.1, 2.2, 1.8, and 1.7 Pa s. If we take the values from the benchtop rheometer (as predicted by the Giesekus fit) as the "ground truth", we obtain percent differences (as compared to values using our swimming robot) of 38%, 43%, 47%, and 50% respectively. Because $\psi_1$ is a dimensional quantity that can range across many orders of magnitude, it is also relevant to report that the estimated absolute error on $\psi_1$ is computed to be 0.8-1.2 Pa s$^2$ at these low shear rates (under 1 hz).

This comparison between our inferred values of $\psi_1$ from experiments and those predicted from a fit to $\psi_1$ measurements taken using a commercial rheometer are in reasonable agreement, considering the assumptions of our asymptotic theory. It is notable that the swimming rheometer is effectively providing a direct estimate for $\psi_1$ at shear rates where commercial rheometers typically cannot. Lastly, we remark that as the tail rotation rate decreases, i.e. decreasing De, the accuracy of our low De theory and formula for $\psi_1$ increases; indeed, this is clearly manifested above in that we observe the relative percent errors decreasing with decreasing $\Omega_S$.

C) Further Details on an Exemplary Robot

C1) Overview

Figure 9:
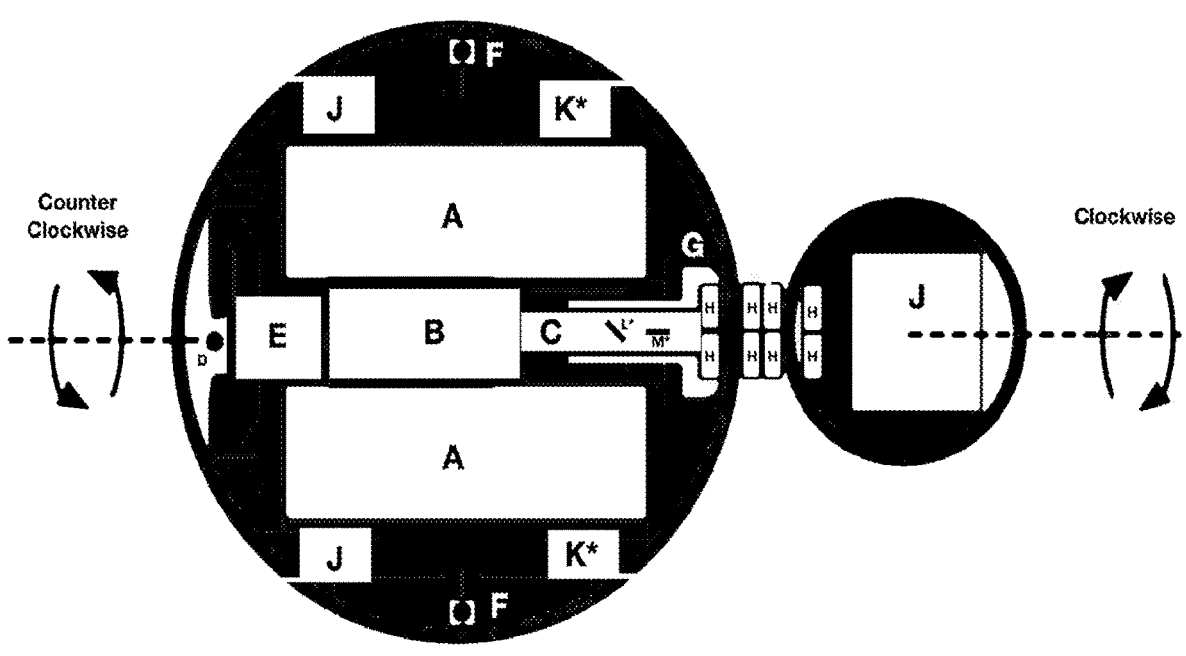
FIG. 9 shows further aspects of robot design.

FIG. 9 is a schematic of the robot showing various optional features that may be present in any combination. Here the labeled parts are as follows. A is the power source, e.g. batteries or similar energy storage. This is lithium polymer rechargeable in current design. B is a rotary actuator, such as a stepper motor or DC motor (we have demonstrated versions with either one). C is the drive shaft. The drive shaft is connected to the motor head. It can be made out of a well-characterized material (such as aluminum, titanium, etc.). 4 magnets are fixed to the termination of the shaft within the head, in a 2 by 2 square pattern). The drive shaft within the head terminates within the shell of the head to ensure robust waterproofing. Sensor package D can include transmitter, status lights, receiver, photodiode, etc. All communication electronics are located in this front region of the head. A clear plastic window is over this region, allowing optical signaling to have reasonable efficiency at 840 nm.

E is the main electronics package. This is the main electronics package, which varies in design. At a minimum, it contains a circuit responsible for speed or torque control (either closed loop or open loop). In our most sophisticated prototypes, this package typically contains a comprehensive electronics system, including a micro-controller, voltage regulator, stepper motor driver, IR transmitter board, and circuits to handle analog sensor inputs. Many of the optional sensors discussed elsewhere would also be placed here. F is the rubber gasket seal. A rubber gasket sits along the equator between two halves of the head in a recessed groove. This allows for the device to be repeatably disassembled, recharged, calibrated, etc.

G is the drive shaft bearing and optional slip ring. A rotary ball bearing assembly sits around the main drive shaft to ensure consistent, concentric rotation relative to the main chassis and minimal friction. An optional slip ring may be mounted just below the bearing, if the shaft is instrumented. In this case where measurement signal must be transmitted from the rotating shaft to the electronics package (fixed to the chassis), a very small slip ring is necessary (see: optional features L and M).

H is the magnets and linker. Small neodymium magnets make up the linker shaft between the head and tail. These magnets couple to both the head and tail through an additional set of 4 magnets in the head (attached to driveshaft termination) and 4 in the tail (attached to main tail chassis). The magnets are arranged in a 2 by 2 pattern in each layer, with alternating polarity directions, to ensure robust rotary coupling. The distance between the head and tail may be easily tuned by increasing the number of layers of magnets. This design allows for modular capacity to quickly swap out different tails, or to change the spacing between the objects—without risking leakage at the rotation interface.

J is the ballast tanks and optional active buoyancy control. Ballast tanks allow for fluid to be injected or withdrawn into small tanks within the head and tail. This allow the density to be tunable. Initial prototypes included such tanks with self-sealing rubber stoppers (for manual adjustment by the injection of fluid with a needle through the stopper), but active control with very small pumps in each of the tanks would also be possible to implement—to enable active buoyancy control.

K is the optional fluid pressure sensors. Pressure sensors at the surface of the robot may optionally be used to calibrate out background flow while the robot is at rest, and they may be used as a redundant rheological tool for directly characterizing the fluid stress while the device is in operation. These sensors route measurement signals either to the onboard microprocessor or they may be filtered and directly transmitted off-robot (via a transmitter; see item D).

L is an optional load cell for direct torque measurements. A load cell at 45 degrees on the drive shaft may be used to directly measure torque. This may be used to control the robot (for example, in constant torque-mode) or it may be used to measure the torque while the robot is under speed control protocols (as traditional rheometers operate).

M is an optional load cell for direct-axial load measurements. A high-gain load cell mounted axially on the drive shaft may be used to directly measure axial loads.

C2) Magnetic Linkage

The mechanism by which the torque is transmitted from the motor shaft in the head to the tail, is through a magnetic "linker" between the head and the tail. This allows the device to be highly modular, waterproof, and allows for the distance between the head and tail to be easily re-configurable (by increasing the height of the magnet stack).

The shaft (physically attached to the motor) terminates within the shell of the large sphere, where there are a set of 4 internal neodymium magnets that create a quadrupole magnetic field, near the shell. The motor within the head is structurally coupled to the exterior of the large sphere.

A series of magnets bridge the interstitial region between the head and the tail; such that the height of the stack determines the distance between the spheres.

A set of four magnets are structurally coupled to the interior of the tail sphere. The poles of the magnets are aligned such that the tail sphere is strongly attracted to the linker (which is driven by the head motor).

The two spheres can be pulled apart easily, for a highly modular design, where different tails can be used with the same head.

The reconfigurable nature of the magnetic linkage also offers opportunities for mechanisms for turning/navigation beyond forward swimming; with no externally moving parts.

This magnetic linker may alternatively be replaced by a standard drive shaft that physically couples the two spheres, in simpler versions of the device (although waterproofing must be more carefully considered in such a case).

C3) Control

Theoretically, the resolution of a very well-tuned swimming rheometer can greatly outperform the axial force transducer resolution of most laboratory bench-top rheometers for low shear rates. The main limiting factor to the resolution of this device is the long-term control stability of the rotation rate (controller drift), and the ability to accurately observe the forward propulsion speed. There are many methods that may be used to control such a device; and they come with trade-offs in terms of system size and complexity. We will discuss both closed-loop and open-loop control methods.

C3.1) Closed Loop Control

Perhaps the easiest solution to achieving very high precision measurements, is to use a photo-receiver, micro-controller and a small stepper motor onboard the device (or one might alternatively use some combination of a digital encoder/DC motor/force transducer/PID controller) to accomplish essentially closed-loop feedback control in response to a signal. This is realistic to build for larger versions of such devices (head diameter greater than 10 mm), as the space needed to house these components is non-negligible, and the total complexity of the system is significant.

However, closed loop feedback control eliminates long-term signal drift, and allows for the highest repeatability and resolution; without the need for additional calibration steps.

Speed and torque protocols can be pre-programmed onto the swimmer, which makes the swimmer fully autonomous. This is relatively easy to achieve with designs which incorporate small micro-controllers and on-board memory, but it would be much more difficult in the simpler designs (which are more compatible with extreme miniaturization). This "extreme miniaturization" challenge is the topic of the next section.

C3.2) Open Loop Control

In an effort to keep in mind the goals of miniaturization, a second method was designed to be easily scalable, for a head diameter down to ≈7 mm. A prototype of this design was built and was shown to be functional, albeit with poorer measurement resolution than the closed-loop speed control version.

Figure 10:
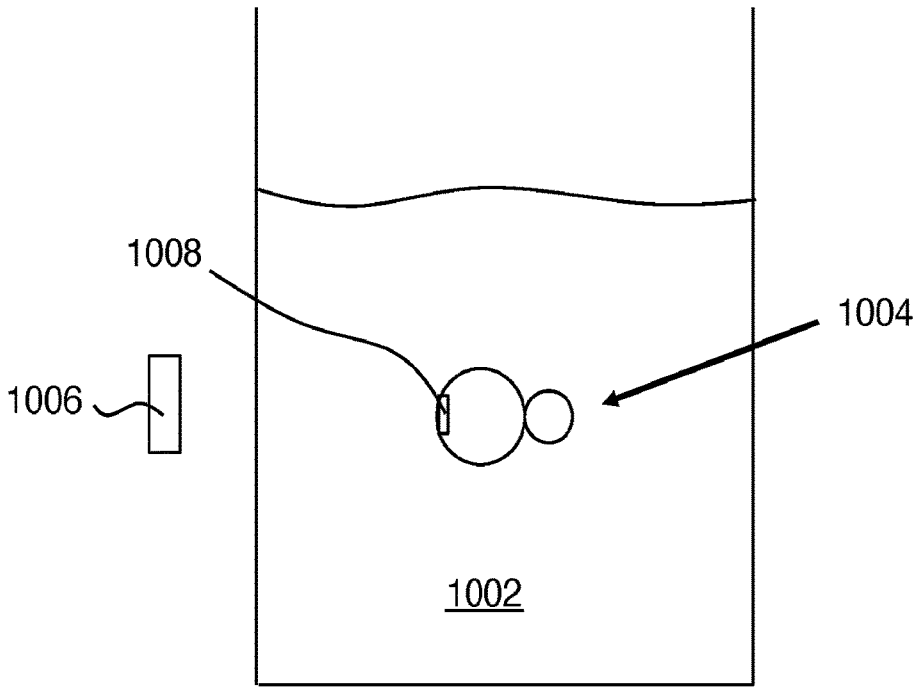
FIG. 10 shows an exemplary approach for optically communicating with a robot to provide open-loop control.

In our prototype device, the target motor speed (or torque) is communicated to the robot via a panel of visible-light LEDs. FIG. 10 schematically show this, where sensor 1008 on robot 1004 in fluid 1002 receives optical information from source 1006. For example, this set of LEDs can blink at a frequency of 1000 Hz, but with pulse width modulation (variable duty cycle) which encodes the rotation rate.

This is an noteworthy method because underwater communications are notoriously difficult due to absorption from the fluid. This can be especially true in highly viscous, complex fluids where the density is high. Typical longer-wavelength signals used for RC communications are infeasible in this application; whereas by contrast, free-space optical communication appears relatively robust.

The Open-Loop design involves the use of a small DC motor, a custom analog-receiver circuit and photodiodes. The custom circuit takes the electrical current pulses from the photodiodes, conditions the signal, and converts the signal to a voltage. This voltage is then used to drive the motor (with a rudimentary motor driver); allowing for the PWM optical signal to be decoded directly into a rotation speed.

The particularly exciting aspect of this design is its simplicity—the entire circuit uses just 4 standard operational amplifiers, 1 FET, 1 BJT and a few resistors and capacitors (no bulky inductors, no digital signal processing, no microcontroller, etc.). If an application demanded a very small swimming rheometer (say less than 1 cm in head diameter)—this receiver and motor controller could be manufactured at scale as an ASIC (application-specific integrated circuit) to be reduced to approximately a 1 mm by 2 mm packaging. This simplicity (and immediate potential size reduction) open up very achievable goals in miniaturization, without resorting to clean-room techniques or redesigning the swimmer from scratch.

The downside to such a device however is that because it operates open-loop, there is no feedback which can correct for potential drift in rotation rate. In our current prototype, we can calibrate the device at the start of each measurement session (most drift we have seen is long-term drift due to changes in the voltage of the on-board battery). We have also been measuring rotation redundantly, directly from the observations/videos of the swimmers, to use as ground truth and evaluate the control accuracy.

C4) Options

C4.1) Direct Torque Measurement on Drive Shaft

To directly measure the torque, a strain gauge may be placed on the main drive shaft, either in the head, tail, or (less preferably) the linker. If using a traditional foil gauge, this would be attached at a 45 degree angle from the axial to measure the torque. This direct measure may be redundant with inferred measurements from the observed propulsion in some operational modes, and could be used to calibrate and validate such devices in certain environments. Especially situations where the robot is encountering significant background flow, changing boundary conditions (e.g. a venturi etc.), or unknown gradients—having an additional redundant direct-measure of mechanical torque is a useful redundancy for a full-feature rheometer.

Assuming the material and geometry of the drive shaft are well-characterized and known, it is feasible to measure (and record) the torque as a function of time. A load cell is permanently fixed to the drive shaft at 45 degrees. These load cells can be exceptionally sensitive—and in combination with a Wheatstone bridge and a slip ring, this small addition to the electronics may provide real-time measurements of torque on the main drive shaft during operation. Analog signal from the digitally balanced Wheatstone bridge can be either recorded onboard the device for later analysis, or it may be transmitted off-robot in real-time.

This measurement may also be used with active-feedback with the motor speed controller, to achieve torque-controlled operational protocols (referred to as "torque-mode").

C4.2) Axial Load Measurement

Similar to the optional direct-torque measure suggested above, a similar load cell may be used in the axial direction to measure axial tension in the direction of the swimming axis. Using a similar method of integrating the sensor (analog signal is sent through a slip ring to a Wheatstone bridge, which sends the measurement to a data acquisition device or transmitter), this load cell can provide a direct measure of properties like the first primary stress coefficient-especially at high strain rates.

This is again a redundant measurement that provides limited utility unless operating the device in conditions where calibration or observation are challenging. It is notable that the load in the axial direction can be exceptionally small at low strain rates (under about 5 Hz), and that this optional feature would only be beneficial in certain fluids, at higher strain rates—where the signal to noise ratio is sufficiently high for the load cell to extract a measurement. Traditional bench-top rheometers have a limitation in sensitivity with such direct-measurement methods; it is likely far more accurate to use propulsion speed and head rotation to infer normal stresses at low frequencies.

Alternatively, it is possible to use a birefringent polymer that can be imaged externally (passive transmitter) as a structural element of the linker. This is an especially promising technique for miniature versions of the device.

C4.3) Fluid Pressure Measurement

It is possible to place small pressure sensors in either the head or the tail to measure pressure in the fluid—either at points along the side of the robot, in the region near the gap, or in the region near the tail jet. These fluid pressure sensors could be used to validate the models (which can predict pressure distributions around the robot)—or they may be used to calibrate out potential pressure-driven flow effects when the robot is stationary.

C4.4) Temperature Measurement

A thermocouple or temperature probe may be placed within the robot to measure the temperature of the robot or the immediate surrounding fluid. It is possible that some prototypes may generate heat as a byproduct of operating over long periods of time. This sensor would be able to indicate if the robot temperature (or the surrounding fluid temperature) was significantly altered. Such effects would change the rheology of the fluid, and thus are important parameters to track if significant heat is generated while the device is operating.

C4.5) Battery Alternatives

At very small scale, we can consider alternatives to batteries as the main source of on-board power, due to practical considerations around manufacturing and system scaling. At very small scales, we have discussed the possibility of chemically or optically powered devices which draw energy locally from their environment. These considerations become especially important if the device is scaled down below a certain critical size (approximately smaller than 100 μm).

C4.6) Data Logging etc.

In the case of many of these optional sensing capacities, a method must be used to either transmit or store the data. Both options are feasible. Particularly, we have demonstrated that moderate-range IR signals (840 nm rather than the typical 940 nm) can communicate signal cleanly through water-based Boger fluids. Mounting a transmitter in the region labelled "D" in FIG. 9 would allow real-time communication of the various on-board sensors. Alternatively, on-board memory could be used by the microcontroller for data recovery post-experiment.

C4.7) Shaft Encoder

For versions of the robot that use a DC motor as the rotary actuator on the main drive shaft, an optical encoder is necessary to use active feedback control to maintain constant rotational speed. While open-loop speed control will give an approximately constant speed, the precision control of speed and torque are the main limiting factors on the resolution of this device as a measurement tool.
Therefore, a feedback system with an encoder on the drive shaft is helpful in the case of typical DC motors. Stepper motors have pseudo-closed loop control because of their positional discrete steps—rendering the encoder less critical for those designs which utilize small stepper motors.

C4.8) Active Buoyancy Control

Active Buoyancy control may be added to the device by instrumenting the ballast tanks with small actuators. If the ballast tank has an open connection to the environment (e.g. a tube connects the ballast tank to the fluid surrounding robot), then the actuators can control the mass of the robot by pumping fluid in and out of the ballast tanks. This method has significant limitations (works well with low viscosity fluids, etc.). The simpler method of manually tuning the robot to maintain neutral buoyancy works well for fluids that are relatively homogeneous in density. Active buoyancy control could extend the capabilities of the device, to situations where the robot must navigate and measure regions of fluid with variable density.

C4.9) Navigation Control

Optional sensors may be added to the device and interface with the on-board microcontroller such as an accelerometer, or other sensors for logging the device's motion. Direct sensor measurement of on-board heading information or velocity information may be especially useful in environments where external observation is particularly difficult (for example, in a system of non-transparent pipes).

C4.10) Turning Capability

Capacity for turning and maneuverability may be added by adding either weight shifting mechanisms within the head or actuated linkages within the magnetic linker (which connects the head and tail). This capacity may be particularly useful for applications where the device must adapt its swimming direction in response to unknown or highly confined environments.

C4.11) Rotation Rate Sensing

Various methods may be implemented for direct-sensing of rotation rate of the head or tail relative to the lab reference frame. This is particularly important to implement if the device is operating in a torque-mode and the rotating exterior of the robot is not visible to the observer. Many methods exist for such measurements—but nearly all must include a reference from the lab frame. For example, one could use a laser diode off-robot pointed at the robot, and a set of photodiodes at the equator of the robot head could compute the rotation rate based on the intensity of the optical reference beam.

D) Further Data

D1) Time-Variable Operative Modes

Figure 11:
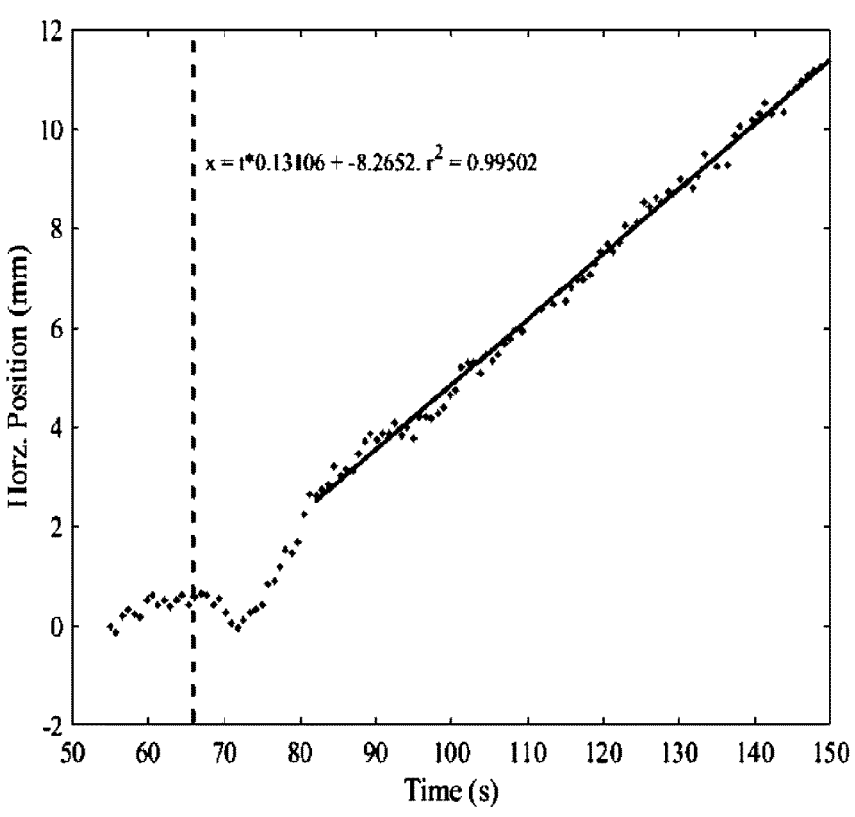
FIG. 11 shows exemplary time-dependent robot motion data.

Preliminary data shown in FIG. 11 demonstrates that when time-dependent signals are given to the robot (e.g. starting, stopping, or some arbitrary time-varying signal), the propulsion speed deviates from the constant-velocity operative mode. In this figure for example, we show that the initial speed directly after starting the robot is significantly larger than the speed at steady-state. Data shown here was collected at De=1.4, based on the average relaxation time measured on a bench top rheometer. This concept of time-variable propulsion in response to an unsteady velocity or torque protocol may be utilized to extract additional rheological characteristics from the fluid, beyond $\psi_1$ and $\psi_2$. The exact rheological properties which may be extracted (such as loss modulus, viscosity, relaxation time, etc.) will depend on the nature of the time-varying input signal and which observables are accessible/measurable.

D2) Measuring $\psi_2$

Figure 12:
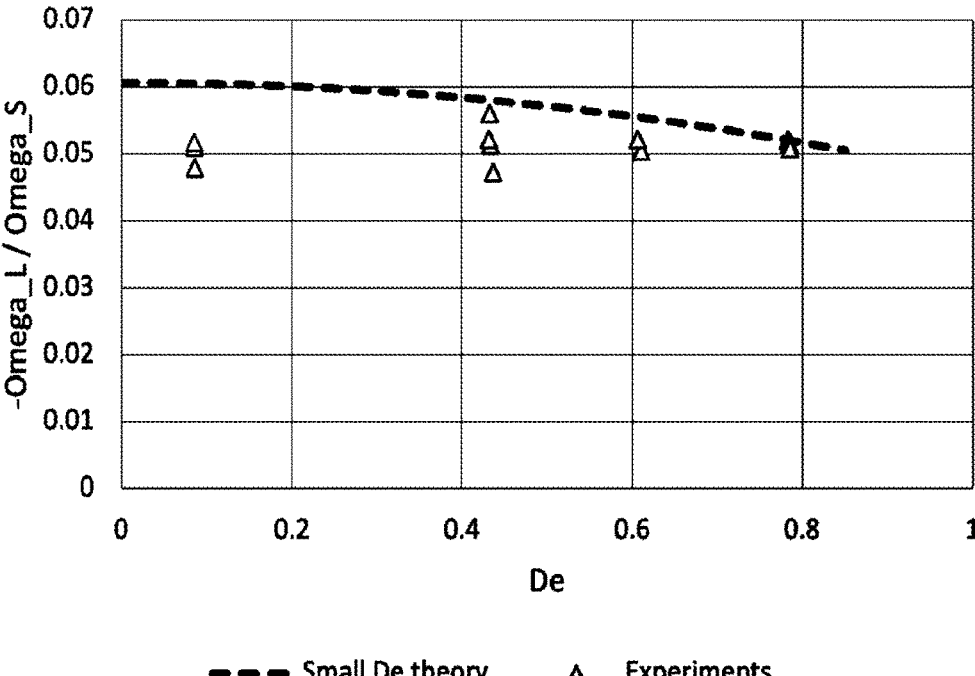
FIG. 12 shows an example of data from which both normal stress components can be determined.

As discussed in section B1.1, $\psi_2$ (the second normal stress coefficient) is a property of complex fluids that may be directly inferred by observing the absolute rotation rate of the "head" with respect to the lab frame. Measurement of the head rotation rate requires excellent internal weight balancing of the robot, but is achievable, as demonstrated in FIG. 12. In FIG. 12 we directly measure the head rotation (relative to the lab frame) at a number of different De conditions, demonstrating the feasibility of collecting data on this additional observable. These experiments match well with the analytical theory predicted for this fluid (dotted line), and could be used with equations 1.3 and 1.4 to directly infer $\psi_2$ at a given De number. It is necessary to also collect corresponding propulsion data (or alternatively, have prior information about the fluid), to simultaneously solve the system of equations for both $\psi_1$ and $\psi_2$.

The invention claimed is:

1. A method of performing in-situ measurements of rheological properties of a complex liquid, the method comprising:

disposing one or more robots in the complex liquid, wherein each robot has a first part and a second part that can be driven in rotation relative to each other;

wherein the one or more robots are each capable of operating in an angular velocity mode and a torque mode, and wherein at least one of the one or more robots is operated in the torque mode;

wherein the angular velocity mode entails control of the relative angular velocity of the first part and the second part;

wherein the torque mode entails control of an applied torque between the first part and the second part; and determining one or more rheological properties of the complex liquid from observation of motion of the one or more robots in the complex liquid.

2. The method of claim 1, wherein the observation of motion includes observation of one or more parameters selected from the group consisting of: angular velocity of the first part, angular velocity of the second part, and center-of-mass motion.

3. The method of claim 1, wherein each of the one or more rheological properties of the complex liquid are steady-state.

4. The method of claim 1, wherein the determining one or more rheological properties of the complex liquid includes determining two or more properties selected from the group consisting of: viscosity, normal stress coefficient $\psi_1$ and normal stress coefficient $\psi_2$.

5. The method of claim 1, wherein the one or more rheological properties includes a spectrum of relaxation times of the complex liquid.

6. The method of claim 1, wherein the robot has an axis of rotation and wherein the robot has a shape that is rotationally symmetric about the axis of rotation.

7. The method of claim 1, wherein the first part and the second part are coupled to each other with a coupling selected from the group consisting of: magnetic coupling and mechanical coupling.

8. The method of claim 1, wherein the first part is a spheroidal head, wherein the second part is a spheroidal tail, and wherein the spheroidal tail is easier to rotate in the complex liquid than the spheroidal head.

9. The method of claim 1, wherein on-board closed-loop control is used for the angular velocity mode or for the torque mode.

10. The method of claim 1, wherein open-loop control is used for the angular velocity mode or for the torque mode.

11. The method of claim 1, further comprising performing on-board measurements of one or more parameters selected from the group consisting of: torque, axial load, fluid pressure, temperature, acceleration, inertial robot orientation, and robot orientation with respect to an external magnetic field.

12. The method of claim 1, wherein the robot is powered according to a method selected from the group consisting of: providing an on-board battery, and optically transmitting power to the robot.

13. The method of claim 1, further comprising performing one or more operations selected from the group consisting of: on-board data logging, on-board data transmission, providing active buoyancy control, providing a robot turning capability with a linkage between the first part and the second part, and providing a robot turning capability by shifting weight within the robot.

14. The method of claim 1, further comprising measuring a robot rotation rate relative to an external frame of reference using a signal provided from the external frame of reference that is received by a sensor on the robot.

15. The method of claim 1, wherein each of the one or more rheological properties of the complex liquid are time-dependent.

* * * * *